United States Patent
Chen et al.

(10) Patent No.: US 8,242,706 B2
(45) Date of Patent: Aug. 14, 2012

(54) DRIVE SYSTEM FOR ILLUMINATION DEVICE

(75) Inventors: Yuan-Chin Chen, Fongshan (TW);
Hung-Lieh Hu, Hsinchu (TW);
Chen-Kun Chen, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 519 days.

(21) Appl. No.: 12/429,796

(22) Filed: Apr. 24, 2009

(65) Prior Publication Data

US 2010/0072920 A1 Mar. 25, 2010

(30) Foreign Application Priority Data

Sep. 24, 2008 (TW) ............................. 97136759 A

(51) Int. Cl.
*H05B 33/02* (2006.01)
(52) U.S. Cl. .................... 315/291; 315/247; 315/362
(58) Field of Classification Search .......... 315/149–159, 315/291, 307, 308, 169.3, 247, 312, 314–318, 315/324, 224–225, 209 R, 219
See application file for complete search history.

(56) References Cited

U.S. PATENT DOCUMENTS

| | | | |
|---|---|---|---|
| 4,845,481 A | 7/1989 | Havel | |
| 6,016,038 A | 1/2000 | Mueller et al. | |
| 6,132,061 A | 10/2000 | Andrus et al. | |
| 7,113,541 B1 | 9/2006 | Lys et al. | |
| 7,417,384 B2 * | 8/2008 | Adamson et al. | 315/291 |
| 7,557,521 B2 * | 7/2009 | Lys | 315/294 |
| 7,800,315 B2 * | 9/2010 | Shteynberg et al. | 315/291 |
| 7,902,771 B2 * | 3/2011 | Shteynberg et al. | 315/307 |
| 2003/0057888 A1 * | 3/2003 | Archenhold et al. | 315/291 |
| 2006/0132061 A1 | 6/2006 | McCormick et al. | |

* cited by examiner

*Primary Examiner* — Shawki S Ismail
*Assistant Examiner* — Christpher Lo
(74) *Attorney, Agent, or Firm* — Stevens & Showalter LLP

(57) ABSTRACT

A drive system for an illumination device includes a plurality of LEDs; an extra load; an illumination setting unit, for providing an illumination parameter such as a work cycle; a power supply unit, for providing a DC current; a microprocessor, for receiving the illumination parameter and generating a plurality of drive signals and a compensation signal according to the received illumination parameter; a plurality of first drive units, for driving the LEDs to receive the DC current in the high-level cycle for illumination; and a second drive unit, for receiving the compensation signal and outputting the DC current to the extra load according to the compensation signal.

12 Claims, 20 Drawing Sheets

— 2 —

DRIVE SYSTEM FOR ILLUMINATION DEVICE

CROSS-REFERENCE TO RELATED APPLICATIONS

This non-provisional application claims priority under 35 U.S.C. §119(a) on Patent Application No(s). 097136759 filed in Taiwan, R.O.C. on Sep. 24, 2008 the entire contents of which are hereby incorporated by reference.

BACKGROUND

1. Technical Field

The present invention relates to a drive system. More particularly, the present invention relates to a drive system for an illumination device.

2. Related Art

An encoding manner of a pulse width modulation (PWM) is generally adopted in the illumination of LEDs to control a light density, color coordinates and a color temperature of the LEDs, instead of driving the LEDs in a manner changing the current or voltage.

As for the PWM, an ON/OFF ratio of a pulse is adjusted during one cycle to determine an average output power. The longer the ON time during one cycle is, the greater the average output power is, and the brighter the LEDs are. However, the general control manners of the PWM have the following characteristics. (1) One LED drive unit has switched (ON or OFF) for many times during one cycle, and the electromagnetic interference (EMI) increases in a proportion of a square of the switching times of the LED drive unit. (2) When the PWM controls a plurality of LED drive units, the worst situation at the power supply end occurs when all the LED drive units are switched from OFF to ON or from ON to OFF simultaneously. In this case, the current to be changed simultaneously in such a short time is a sum of the currents of all the LED drive units. When the system includes a greater number of LED drive units, the instant value of the total current is rather large, and as a result, the EMI is increased. Specifically, if the power current is switched for many times during one cycle, the EMI is increased severely.

Furthermore, a great current change rate may result in a power rail-collapse at the power supply end, and as a result, the power supply voltage received by the integrated circuit (IC) may be insufficient, and thus the IC cannot work normally.

In addition, if the Z-profile of a circuit is not well designed by a circuit designer for the power supply end and the ground end, the great current change rate may result in an overshoot of the power supply voltage. If the overshoot voltage extent exceeds the maximum value an IC in that circuit can endure, the IC may be damaged.

Furthermore, the rising time of the power may not come up with the great current change rate, and thus cannot come up with the rapid state transition. Therefore, the power integrity (PI) problem should be considered.

In the U.S. Pat. No. 4,845,481, a design of driving a plurality of LEDs in a manner of PWM encoding scheme has been proposed, in which the brightness of the LEDs is controlled by manipulating the driving power's pulse width.

In the U.S. Pat. Nos. 6,016,038, and 7,113,541, LEDs are controlled by processor in a PWM way, but a current switching problem still exits. In the U.S. Pat. No. 6,132,061, the PWM current switching problem is solved by using a dummy load. However, as for a plurality of LED drive units, at the instant of a low load or no loads, all the large currents flow through the dummy load, and such large currents result in a great energy waste at the dummy load, which produces a lot of heats, and does not meet the energy saving requirement. Furthermore, as for the power supply, there are still switching ripples, which may bring interferences to the circuit.

SUMMARY

The present invention provides a drive system for an illumination device, which includes: a plurality of LEDs; an extra load; an illumination setting unit, for providing an illumination parameter, in which the illumination parameter includes a work cycle; a power supply unit, for providing a direct current (DC) output; a microprocessor, for receiving the illumination parameter and generating a plurality of drive signals and a compensation signal according to the received illumination parameter, in which the drive signals are corresponding to the LEDs respectively; a plurality of first drive units corresponding to the LEDs and the drive signals, in which each of the first drive units receives a drive signal to drive a corresponding LED; and a second drive unit, for receiving the compensation signal and outputting the DC current to the extra load according to the compensation signal.

Furthermore, the drive system for an illumination device of the present invention includes: a plurality of LED lamps, and each of the LED lamps has n LEDs, where n is an integer greater than or equal to 1; an extra load; an illumination setting unit, for providing an illumination parameter, in which the illumination parameter includes n work cycles, and the n work cycles correspond to the n LEDs in each of the LED lamps; a power supply unit, for providing a DC current output; a microprocessor, for receiving the illumination parameter and generating a plurality of drive signal sets and a compensation signal according to the received illumination parameter, in which the drive signal sets correspond to the LED lamps respectively, and each of the drive signal sets has n drive signals corresponding to the n LEDs and n work cycles; a plurality of first drive unit groups corresponding to the LED lamps and the drive signal sets, in which each of the first drive unit groups has n first drive units corresponding to the n LEDs and n drive signals, and each of the first drive units receives a corresponding drive signal to drive a corresponding LED, such that the corresponding LED receives the DC current for illumination; and a second drive unit, for receiving the compensation signal and outputting the DC current to the extra load according to the compensation signal.

Furthermore, the drive system for an illumination device of the present invention includes: a plurality of LED lamps, in which each of the LED lamps has n LEDs, where n is an integer greater than or equal to 1; an extra load; an illumination setting unit, for providing an illumination parameter, in which the illumination parameter includes n work cycles, and the n work cycles correspond to the n LEDs in each of the LED lamps; a power supply unit, for providing a DC current output; a microprocessor, for receiving the illumination parameter, and generating a plurality of drive signal sets and a compensation signal according to the received illumination parameter, the drive signal sets correspond to the LED lamps respectively, and each of the drive signal sets has n drive signals correspond to the n LEDs and n work cycles; a plurality of first drive unit groups, corresponding to the LED lamps and the drive signal sets, in which each of the first drive unit groups has n first drive units corresponding to the n LEDs and n drive signals, and each of the first drive units receives a corresponding drive signal to drive a corresponding LED, such that the corresponding LED receives the DC current in the high-level cycle for illumination; and a second drive unit, for receiving the compensation signal and outputting the DC current to the extra load according to the compensation signal.

BRIEF DESCRIPTION OF THE DRAWINGS

The exemplary embodiments will become more fully understood from the detailed description given herein below for illustration only, and thus is not limitative of the present invention, and wherein.

DETAILED DESCRIPTION

Figure 1A:
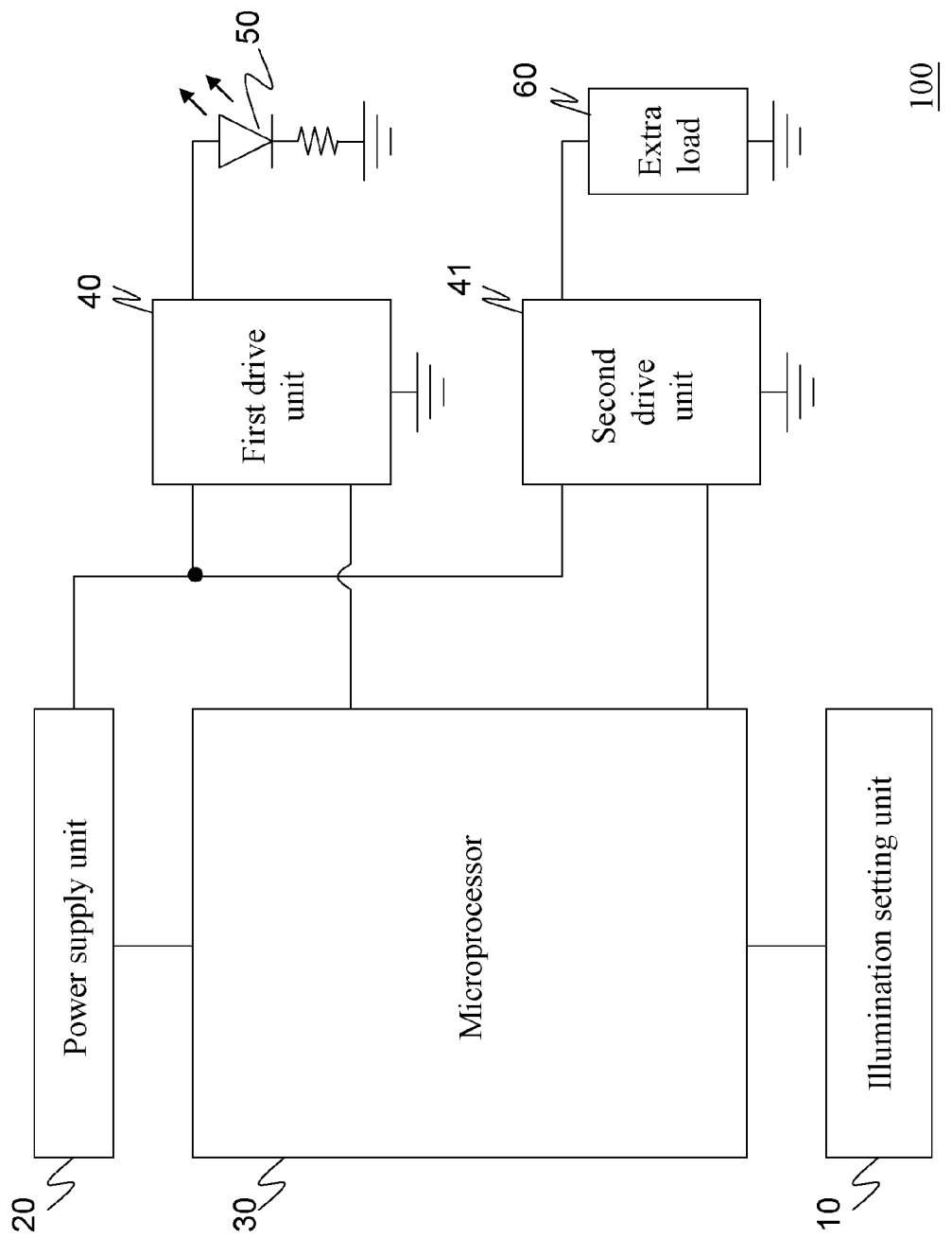
FIG. 1A is a circuit block diagram of a first exemplary embodiment.

FIG. 1A is a circuit block diagram of a first exemplary embodiment. Referring to FIG. 1A, a drive system 100 for an illumination device includes an illumination setting unit 10, a power supply unit 20, a microprocessor 30, a first drive unit 40, a second drive unit 41, an LED 50, and an extra load 60.

The illumination setting unit 10 provides an illumination parameter, and the illumination parameter includes a work cycle, a resolution. The illumination setting unit 10 may be, for example, a man-machine interface, a keyboard, a DIP switch, a signal generator, or a memory. When the illumination setting unit 10 is a man-machine interface, a keyboard, a DIP switch, or a signal generator, it may be used to set the illumination parameter. When the illumination setting unit 10 is a memory, it may be used to store the illumination parameter. Furthermore, the illumination setting unit 10 may serve as a communication interface for transmitting an external digital signal or analog signal of the drive system 100 to the microprocessor 30.

The relation among the data such as the work cycle and the resolution is described below. For example, if the work cycle is 70%, and the resolution is 128 bits, it indicates that the driven LED 50 has 90 bits in an ON state (128*70%=89.6, which counts as 90) and 38 bits in an OFF state (128*30%=38.4, which counts as 38). If the time period of each bit is 10 ms, the LED 50 is in the ON state for 900 ms and it is the OFF state for 380 ms, and thus the luminance of the LED 50 is controlled.

The power supply unit 20 is electrically connected to the microprocessor 30, the first drive unit 40, and the second drive unit 41 respectively. The power supply unit 20 is used to provide a power required by the microprocessor 30, and outputs the DC current to the first drive unit 40 and the second drive unit 41.

The microprocessor 30 is electrically connected to the illumination setting unit 10. The microprocessor 30 is an arithmetic-logic functional circuit architecture. The microprocessor 30 receives the illumination parameter and generates a drive signal and a compensation signal according to the received illumination parameter. The drive signal corresponds to the LED 50, and the drive signal has a high-level cycle, a low-level cycle, and a whole cycle, which are demonstrated in FIG. 3. The ratio of the high-level cycle to the whole cycle is substantially equal to the work cycle. The microprocessor 30 may be, for example, a system on chip (SOC), an application specific integrated circuit (ASIC), a digital signal processor (DSP), or a field programmable gate array (FPGA).

The first drive unit 40 is electrically connected to the microprocessor 30 and the LED 50 respectively. The first drive unit 40 is corresponding to the LED 50 and the drive signal. The first drive unit 40 receives the drive signal to drive the corresponding LED 50, such that the corresponding LED 50 receives the DC current in the high-level cycle for illumination.

The second drive unit 41 is electrically connected to the microprocessor 30, the power supply unit 20, and the extra load 60 respectively. The second drive unit 41 receives the compensation signal output by the microprocessor 30, and controls to output the current to the extra load 60 according to the compensation signal, so as to compensate the DC current output by the power supply unit 20 into a constant current state. The extra load 60 may be, for example, an LED or a load capable of consuming the current. The second drive unit 41 may be, for example, an LED driver IC.

Figure 1B:
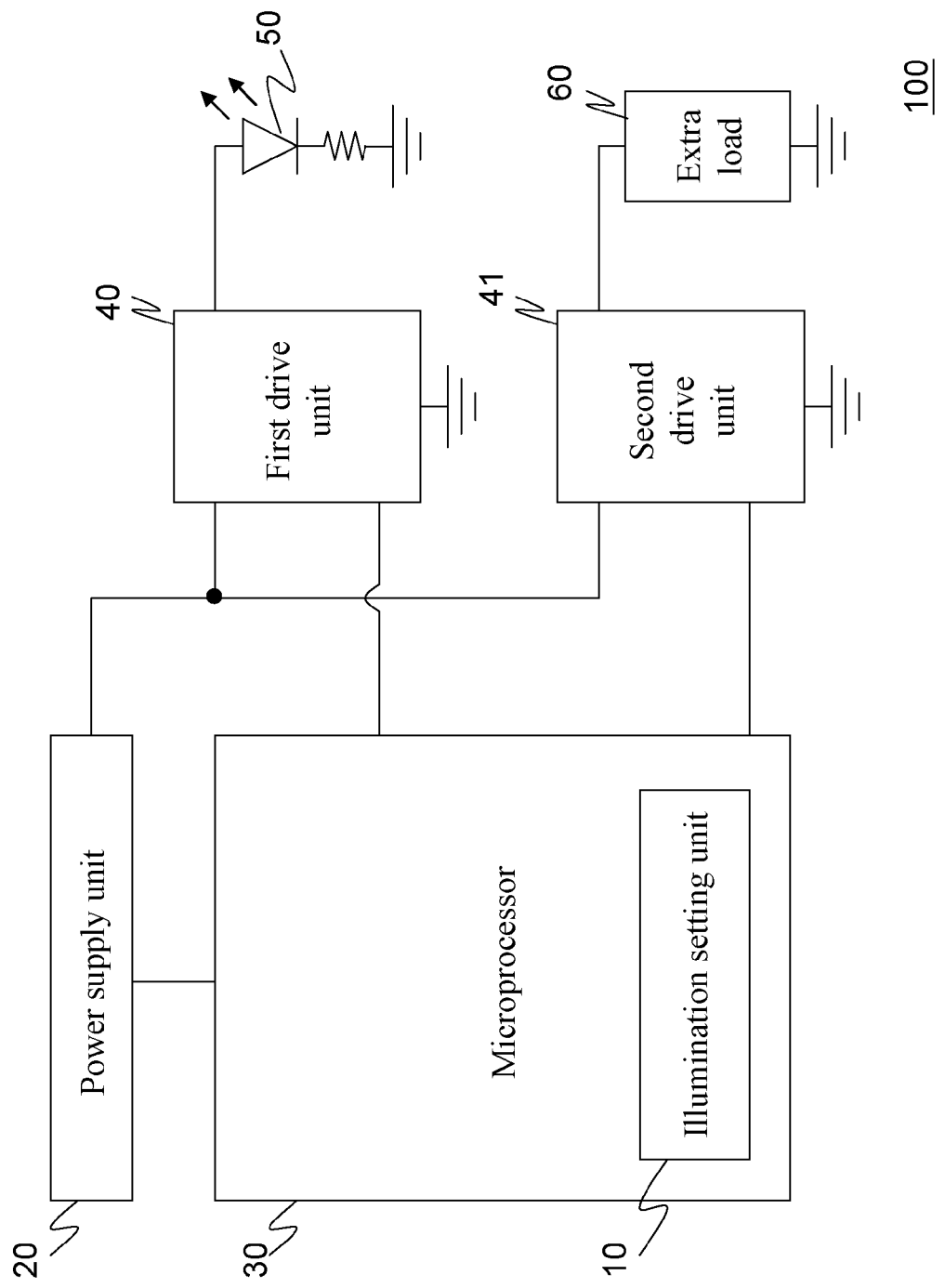
FIG. 1B is a circuit block diagram of a second exemplary embodiment.

FIG. 1B is a circuit block diagram of a second exemplary embodiment. Referring to FIG. 1B, the difference between the second exemplary embodiment and the first exemplary embodiment lies in that, the illumination setting unit 10 is disposed inside the microprocessor 30, and the illumination setting unit 10 stores the illumination parameter, so as to provide the illumination parameter for being read by the microprocessor 30, thereby performing an operation program on the drive signal, and the rest parts of the second embodiment are the same as that of the first embodiment and will not be described herein.

Figure 2:
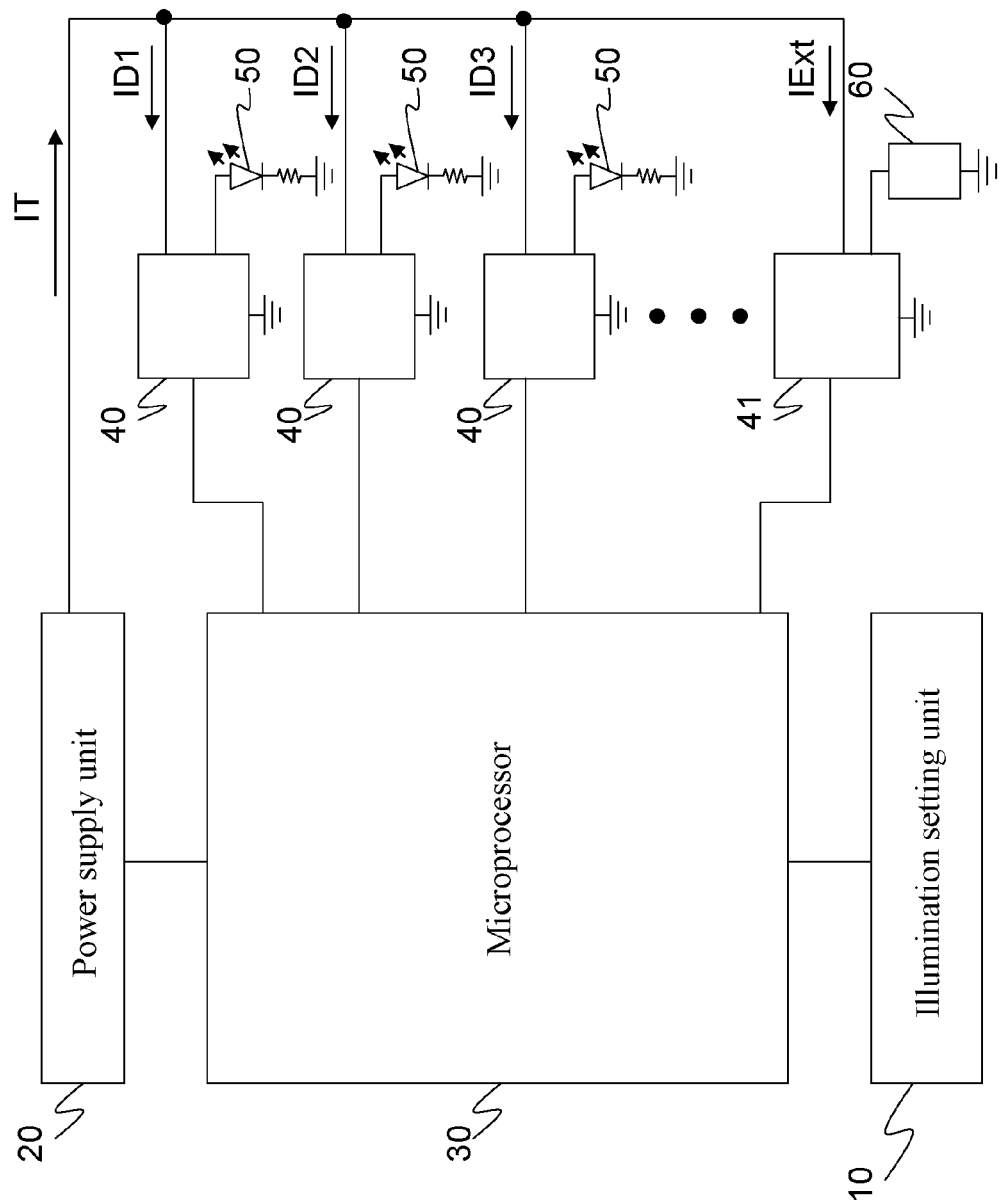
FIG. 2 is a circuit block diagram of a third exemplary embodiment.

FIG. 2 is a circuit block diagram of a third exemplary embodiment of the present invention. Referring to FIG. 2, a drive system 150 for an illumination device includes an illumination setting unit 10, a power supply unit 20, a microprocessor 30, a plurality of first drive units 40, a second drive unit 41, a plurality of LEDs 50, and an extra load 60.

The illumination setting unit 10 provides an illumination parameter, and the illumination parameter includes a work cycle, a resolution, a ratio of primary colors for polychrome use, or a number of the first drive units 40. The illumination setting unit 10 may be, for example, a man-machine interface, a keyboard, a DIP switch, a signal generator, or a memory. When the illumination setting unit 10 is a man-machine interface, a keyboard, a DIP switch, or a signal generator, it may be used to set the illumination parameter. When the illumination setting unit 10 is a memory, it may be used to store the illumination parameter. Furthermore, the illumination setting unit 10 may serve as a communication interface for transmitting an external digital signal or analog signal of the drive system 150 to the microprocessor 30.

The power supply unit 20 is electrically connected to the microprocessor 30, the first drive units 40, and the second drive unit 41 respectively. The power supply unit 20 provides a power required by the microprocessor 30, and outputs the DC current to the first drive units 40 and the second drive unit 41.

The microprocessor 30 is electrically connected to the illumination setting unit 10. The microprocessor 30 is an arithmetic-logic functional circuit architecture. The microprocessor 30 receives the illumination parameter and generates a plurality of drive signals and a compensation signal according to the received illumination parameter. The drive signals correspond to the LEDs 50, and each of the drive signals has a high-level cycle, a low-level cycle, and a whole cycle, and the ratio of the high-level cycle to the whole cycle is substantially equal to the work cycle. A starting time point of a high-level cycle of one of the drive signals and a starting time point of a high-level cycle of another drive signal are spaced apart for a time period of one low-level cycle.

The microprocessor 30 may be, for example, a SOC, an ASIC, a DSP, or a FPGA.

The first drive units 40 are electrically connected to the microprocessor 30 and the LEDs 50. The first drive units 40 correspond to the LEDs 50 and the drive signals. Each of the first drive units 40 receives a drive signal to drive a corresponding LED 50, such that the corresponding LED 50 receives the DC current in the high-level cycle for illumination.

The second drive unit 41 is electrically connected to the microprocessor 30, the power supply unit 20, and the extra load 60 respectively. The second drive unit 41 receives the compensation signal output by the microprocessor 30, and controls to output the current to the extra load 60 according to the compensation signal, so as to compensate the DC current output by the power supply unit 20 into a constant current state. The extra load 60 may be, for example, an LED or a load capable of consuming the current. The second drive unit 41 may be, for example, an LED driver IC.

The operation principle of the drive system 150 is described hereinafter. After the illumination parameter is input to the microprocessor 30 through the illumination setting unit 10, the microprocessor 30 calculates the drive signals and the compensation signal for all the first drive units 40 and the second drive unit 41, and outputs the drive signals and the compensation signal to the corresponding first drive units 40 and the second drive unit 41 through an input/output port of the microprocessor 30. The first drive units 40 and the second drive unit 41 output a current to the corresponding LEDs 50 and the extra load 60 according to the drive signals and the compensation signal respectively. The LEDs 50 may be, for example, single-color (e.g. white, yellow, red, green, or blue) LEDs, or mixed-color (e.g. yellow-green, or blue-green) LEDs.

A total current IT is a sum of the currents of all the first drive units 40 and the second drive unit 41. The current ID1, current ID2, and current ID3 are the currents of the first drive units 40, which are A ampere. The current IExt is a consumption current of the second drive unit 41, which is the same as the current ID1, current ID2, and current ID3 in magnitude, that is, A ampere.

The second drive unit 41 is connected to one extra load 60. The second drive unit 41 is mainly used to compensate a PWM switching state to keep the total current IT constant. Each of the first drive units 40 receives a drive signal from the microprocessor 30 to turn on or turn off the corresponding first drive unit 40 to output the current. The second drive unit 41 receives the compensation signal from the microprocessor 30, so that the second drive unit 41 is turned on or turned off to output the current.

When the drive signal is at a high-level state, the first drive units 40 output a current of A ampere to the LEDs 50 respectively, and when the compensation signal is at the high-level state, the second drive unit 41 outputs a current of A ampere to the extra load 60. When the drive signal is at a low-level state, the first drive units 40 output a current of 0 ampere, and when the compensation signal is at the low-level state, the second drive unit 41 outputs a current of 0 ampere. Therefore, the total current IT is maintained in a constant current state and does not change with the PWM switching of the first drive units 40, and the total current IT has a minimum peak value. In addition, the current ID1, the current ID2, the current ID3, and the current IExt have a minimum switching number during one cycle (at most switching once from the low-level state to the high-level state and once from the high-level state to the low-level state).

Figure 3:
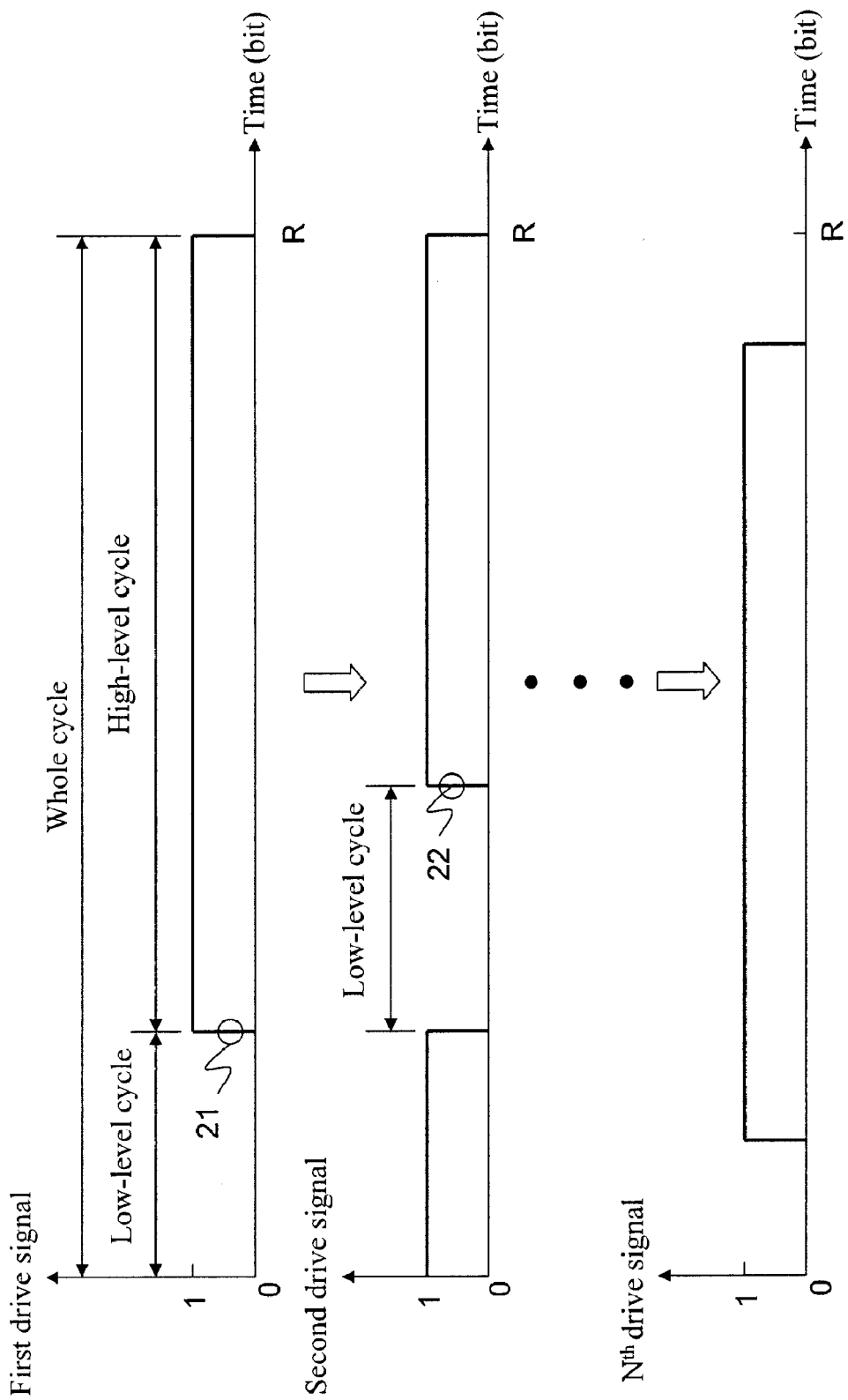
FIG. 3 is a schematic view of drive signals of the exemplary embodiment.

FIG. 3 is a schematic view of drive signals of the exemplary embodiment. Referring to FIG. 3, the longitudinal axis indicates the drive signals (with a unit level as the unit), the transverse axis indicates the time (with a bit as the unit), and R represents the resolution of a whole cycle in bits. A starting time point 21 of a high-level cycle of a first drive signal and a starting time point 22 of a high-level cycle of a second drive signal are spaced apart for a time period of one low-level cycle. The starting time point 22 of the high-level cycle of the second drive signal and a starting time point (not shown) of a high-level cycle of a third drive signal are spaced apart for a time period of one low-level cycle, and so forth. The arrangement of the first drive signal is that the low-level cycle is set first, and then the high-level cycle is set. The arrangement of the first drive signal may also be that the high-level cycle is set in the beginning of a whole cycle, and then the low-level cycle is set subsequently. Substantially, the next drive signal in time sequence is a circular repeat of the previous drive signal, which may be leftward or rightward, and the bit number of a circular repeat stands for the time period of the low-level cycle or the high-level cycle alternatively.

Furthermore, the time period spaced apart there-between for one low-level cycle may be advanced or delayed in time sequence. In the embodiment of FIG. 3, for example, it is delayed for one low-level cycle, but not limited thereto.

Figure 4:
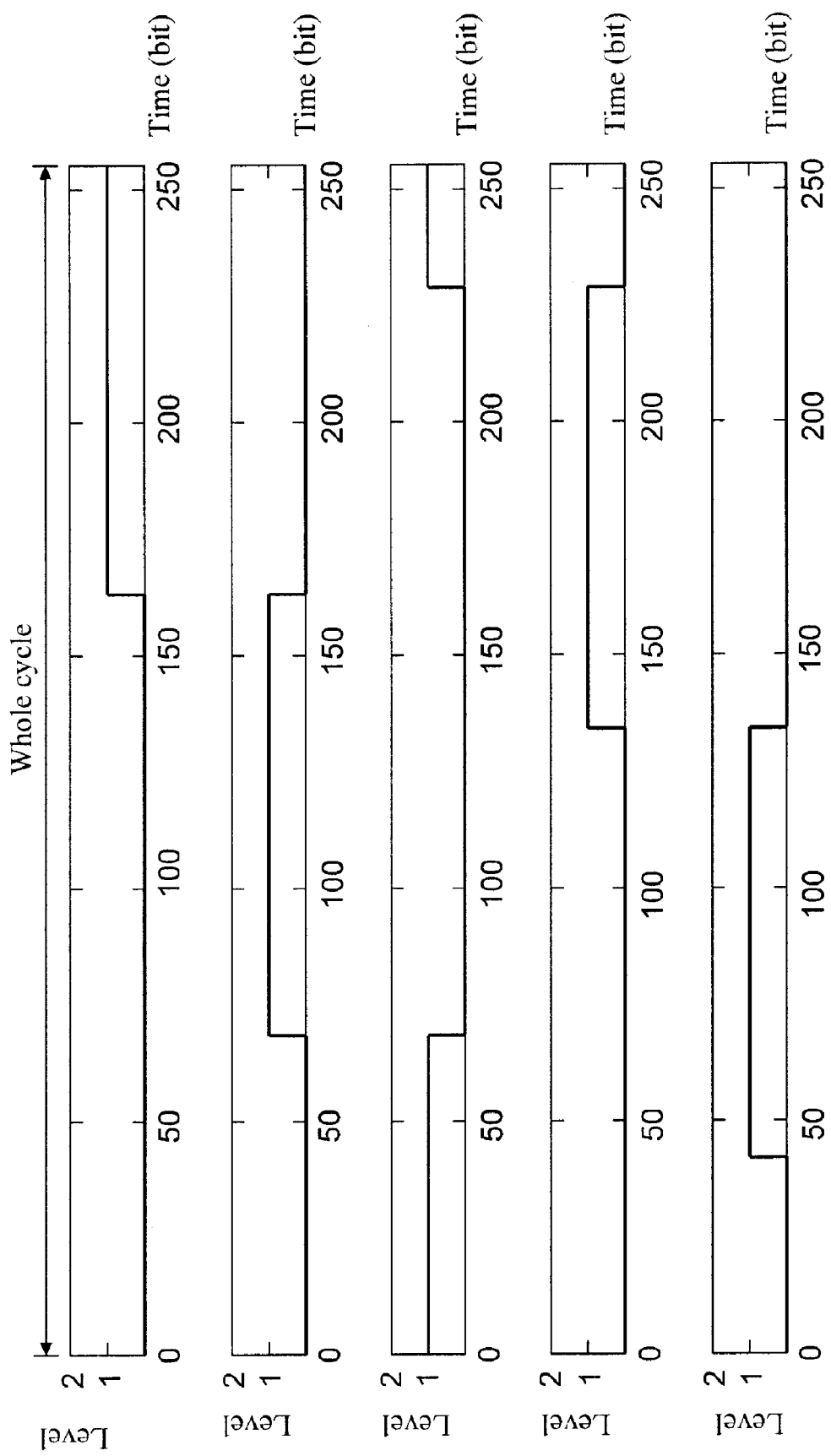
FIG. 4 is a schematic view of drive signals according to the third exemplary embodiment.

FIG. 4 is a schematic view of drive signals according to the third exemplary embodiment. Referring to FIG. 4, the number of the first drive units 40 is 5, the work cycle is 0.37, and the resolution is 255 bits, so that the microprocessor 30 calculates the drive signal for each of the first drive units 40 according to an encoding rule. The first one of the first drive units 40 receives a first drive signal. The second one of the first drive units 40 receives a second drive signal. The third one of the first drive units 40 receives a third drive signal. The fourth one of the first drive units 40 receives a fourth drive signal. The fifth one of the first drive units 40 receives a fifth drive signal.

Figure 5A:
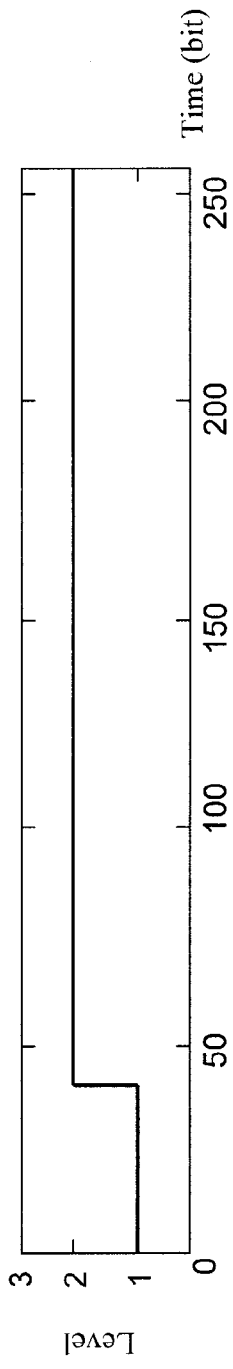
FIG. 5A is a schematic view of a sum of drive signals according to the third exemplary embodiment.
Figure 5B:
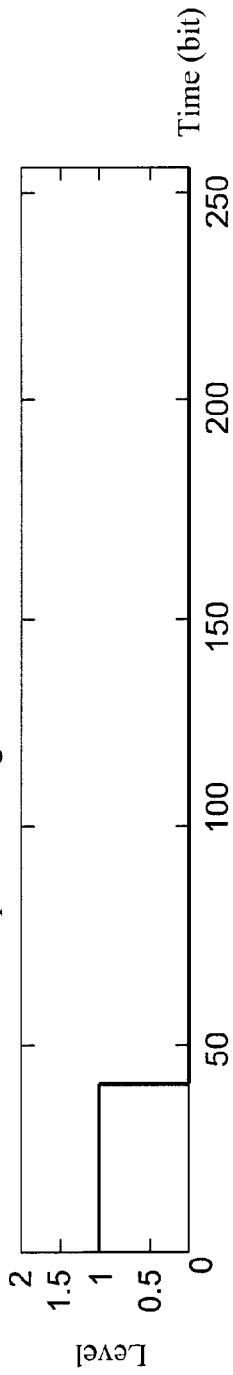
FIG. 5B is a schematic view of a compensation signal according to the third exemplary embodiment.
Figure 5C:
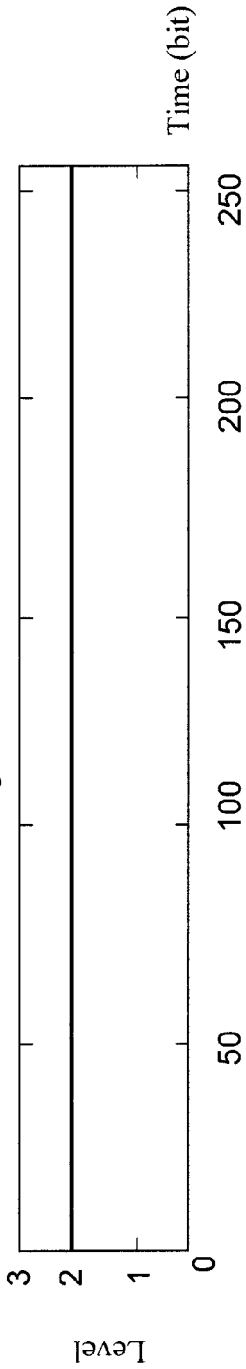
FIG. 5C is a schematic view of a sum of signals according to the third exemplary embodiment.

FIGS. 5A, 5B, and 5C are schematic views of a sum of signals according to the exemplary embodiment. Referring to FIG. 5A, a sum of the drive signals of all the first drive units 40 is shown. The first drive signal, the second drive signal, the third drive signal, the fourth drive signal, and the fifth drive signal of each first drive unit are summed up to a value designated as high-level sum at each time point during the whole cycle thereof. That is, the high-level sum refers to the summation of the level values of the first drive signal, the second drive signal, the third drive signal, the fourth drive signal, and the fifth drive signal of each first drive unit at each time point in one whole cycle. The maximum value among the high-level sums is the highest level value, as shown in FIG. 5A, and the maximum value of the high-level sums is 2 unit levels, so the highest level value is 2. As for LED application, a unit level refers to one unit current intensity for driving the LED to illuminate. Therefore, when two LEDs are driven to illuminate at a specific time point, the total current required is two units of current intensity, i.e., two unit levels in this embodiment.

FIG. 5B shows a compensation signal of the second drive unit 41. It can be seen that, the compensation signal is a signal for compensating each high-level sum to the highest level value at each time point during the whole cycle. The high-level cycle may be represented by time, and may also be represented by bits. As shown in FIG. 5C, it shows a sum of drive signals of all the drive units (including the first drive units 40 and the second drive unit 41).

As seen from FIG. 5A that, the sum of the drive signals of all the first drive units 40 is an unstable DC current, and if not being compensated by the second drive unit 41, the total current IT compensation will not become a DC current. Therefore, with the compensation signal of the second drive unit 41, the total current IT is compensated into a DC current, and the sum of signals of all the drive units will become a stable DC current. Furthermore, it can be seen that the sum of the drive signals of all the drive units has merely a level of 2 (varies in accordance with the work cycle), so that the level value of the total current IT is significantly reduced, and the total current IT is a DC current completely, thereby solving the above power integrity problem.

Figure 6:
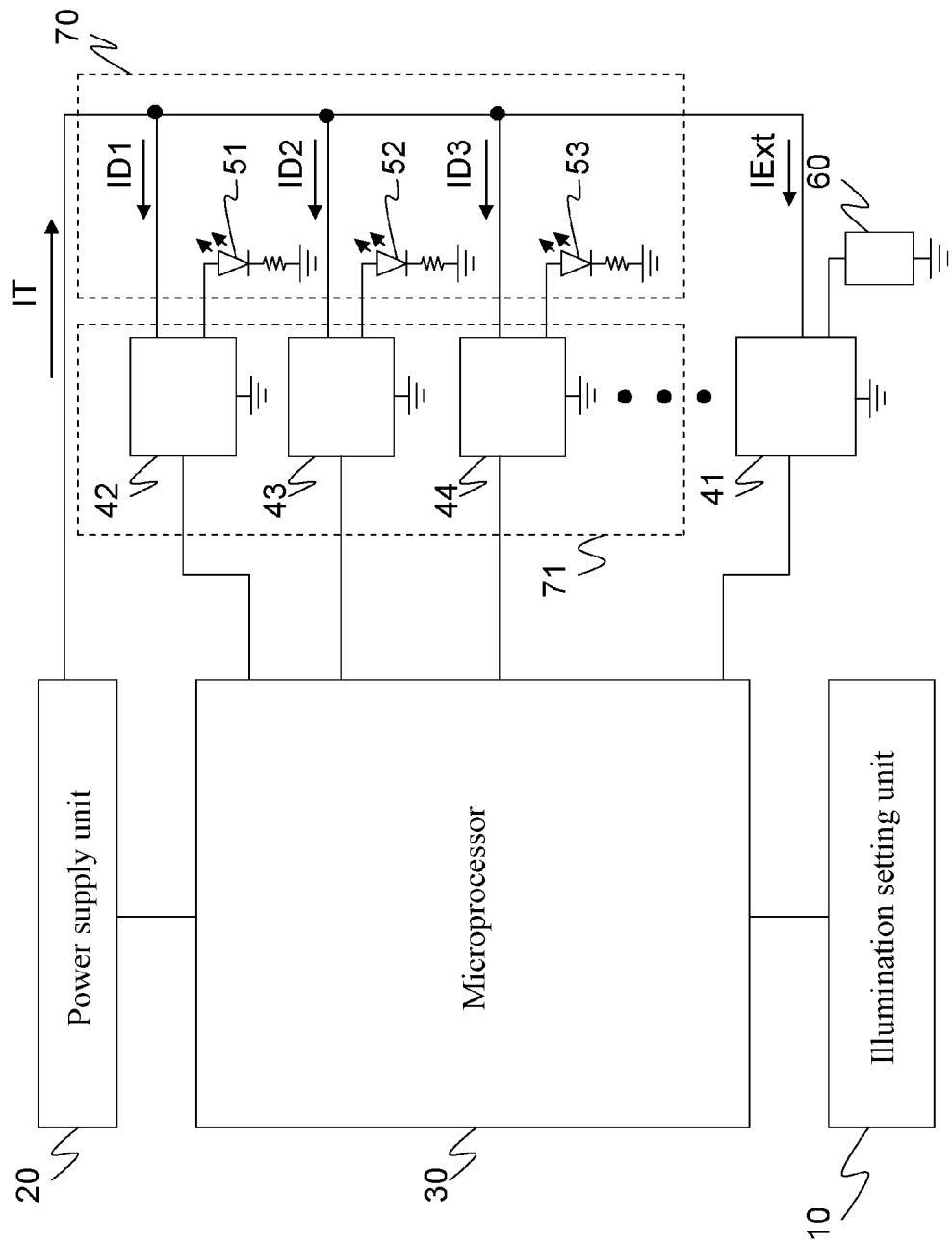
FIG. 6 is a circuit block diagram of a fourth exemplary embodiment.

A drive system for polychrome (e.g. red, green, and blue) LEDs is described hereinafter. FIG. 6 is a circuit block diagram of a fourth exemplary embodiment. Referring to FIG. 6, a drive system 200 for an illumination device includes: an illumination setting unit 10, a power supply unit 20, a microprocessor 30, a plurality of LED lamps 70, a plurality of first drive unit groups 71, a second drive unit 41, and an extra load 60.

Each of the LED lamps 70 has n LEDs. A first drive unit 42 of each LED lamp 70 is connected to the red LED 51, a first drive unit 43 is connected to the green LED 52, and a first drive unit 44 is connected to the blue LED 53, and so forth.

All the n LEDs in each of the LED lamps 70 correspond to one another, and n is an integer greater than or equal to 1. The above statement refers to a corresponding relation in color, for example, the illuminant color of the first LED in the first LED lamp 70 is the same as that of the first LED in the second LED lamp 70. The illuminant color of the second LED in the first LED lamp 70 is the same as that of the second LED in the second LED lamp 70.

The illumination setting unit 10 provides an illumination parameter. The illumination parameter includes n work cycles, a resolution, a ratio of polychrome primary colors, or a number of first drive units 40. The n work cycles correspond to the n LEDs in each LED lamp 70.

The power supply unit 20 is electrically connected to the microprocessor 30, the LED lamps 70, and the second drive unit 41. The power supply unit 20 provides a power required by the microprocessor 30, and outputs the DC current to the LED lamps 70 and the second drive unit 41.

The microprocessor 30 receives the illumination parameter, and generates a plurality of drive signal sets and a compensation signal according to the received illumination parameter. The drive signal sets correspond to the LED lamps 70 respectively. Each drive signal set has n drive signals corresponding to the n LEDs and the n work cycles. Each drive signal has a high-level cycle, a low-level cycle, and a whole cycle, and the ratio of each high-level cycle to a corresponding whole cycle is substantially equal to the corresponding work cycle.

A starting time point of the $i^{th}$ high-level cycle of one of the drive signal sets and a starting time point of the $i^{th}$ high-level cycle of another one of the drive signal sets are spaced apart for a time period of one low-level cycle, and $1 \leq i \leq n$, where i is a positive integer. Furthermore, the time period spaced apart there-between for one low-level cycle may be advanced or delayed in time sequence.

A plurality of first drive unit groups 71 corresponds to the LED lamps 70 and the drive signal sets. Each first drive unit group has n first drive units corresponding to the n LEDs and the n drive signals. Each of the first drive units receives a corresponding drive signal to drive a corresponding LED, such that the corresponding LED receives the DC current in the high-level cycle for illumination.

There is a high-level sum of all the n drive signals at each time point during the whole cycle. The difference between the high-level sums at each time point is less than or equal to one unit level. For example, when the LEDs are driven to illuminate at a work cycle (a high-level cycle), the drive signals output one unit level. The high-level sum is the summation of the high levels of all the drive signals at each time point, which may be m unit levels. If all the n drive signals are in the high-level cycle at a certain time point, the high-level sum at such a time point is n. If m drive signals are in the high-level cycle at a certain time point, the high-level sum at such a time point is m, in which $1 \leq m \leq n$.

The second drive unit 41 receives the compensation signal and outputs the DC current to the extra load 60 according to the compensation signal. All the drive signals sum up to a value designated as high-level sum at each time point during the whole cycle, and the highest level value is the maximum value among the high-level sums. The compensation signal is a signal for compensating each high-level sum to the highest level value at each time point during the whole cycle.

Figure 7:
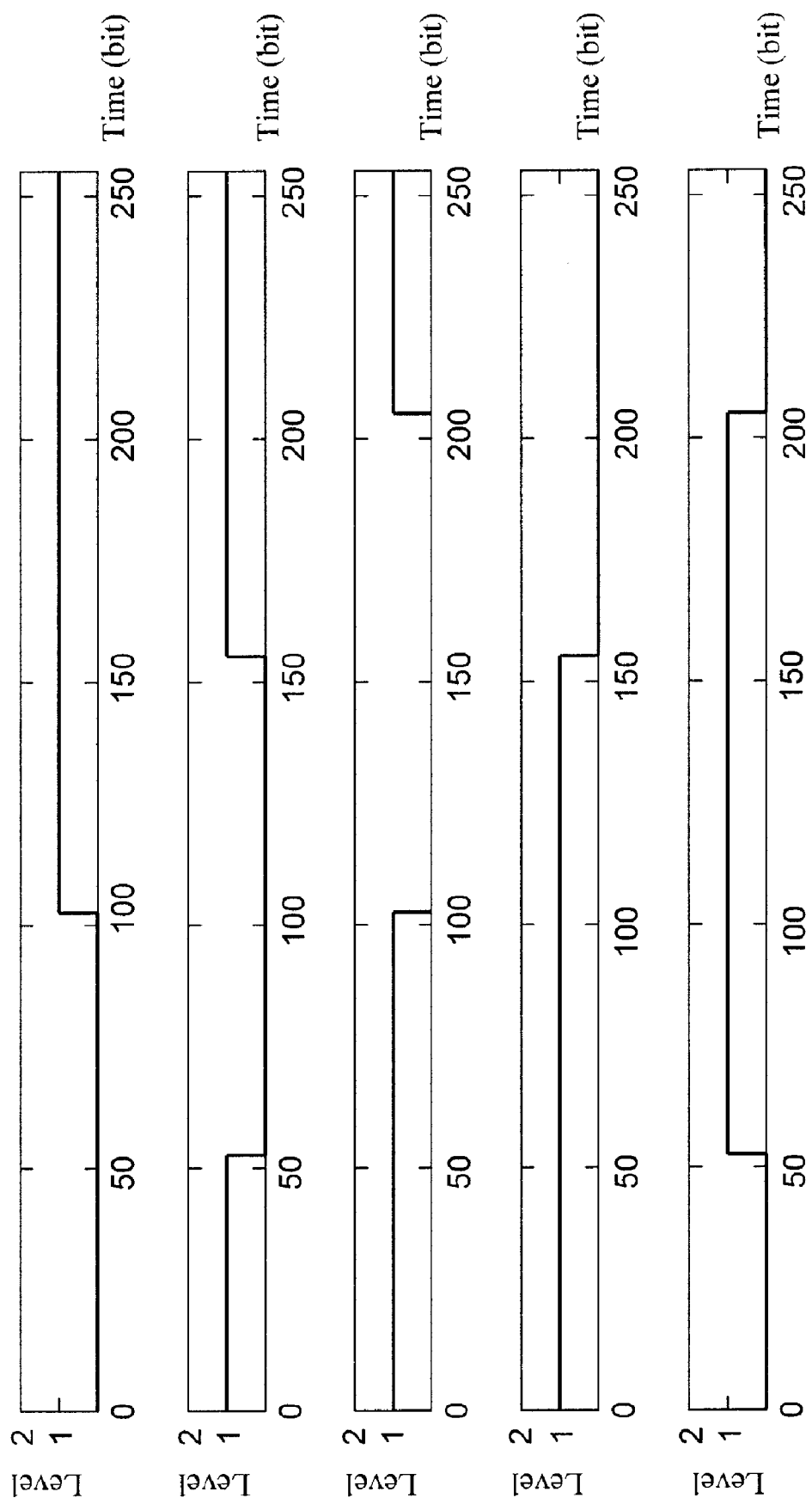
FIG. 7 is a schematic view of drive signals of red LED drive units.
Figure 8:
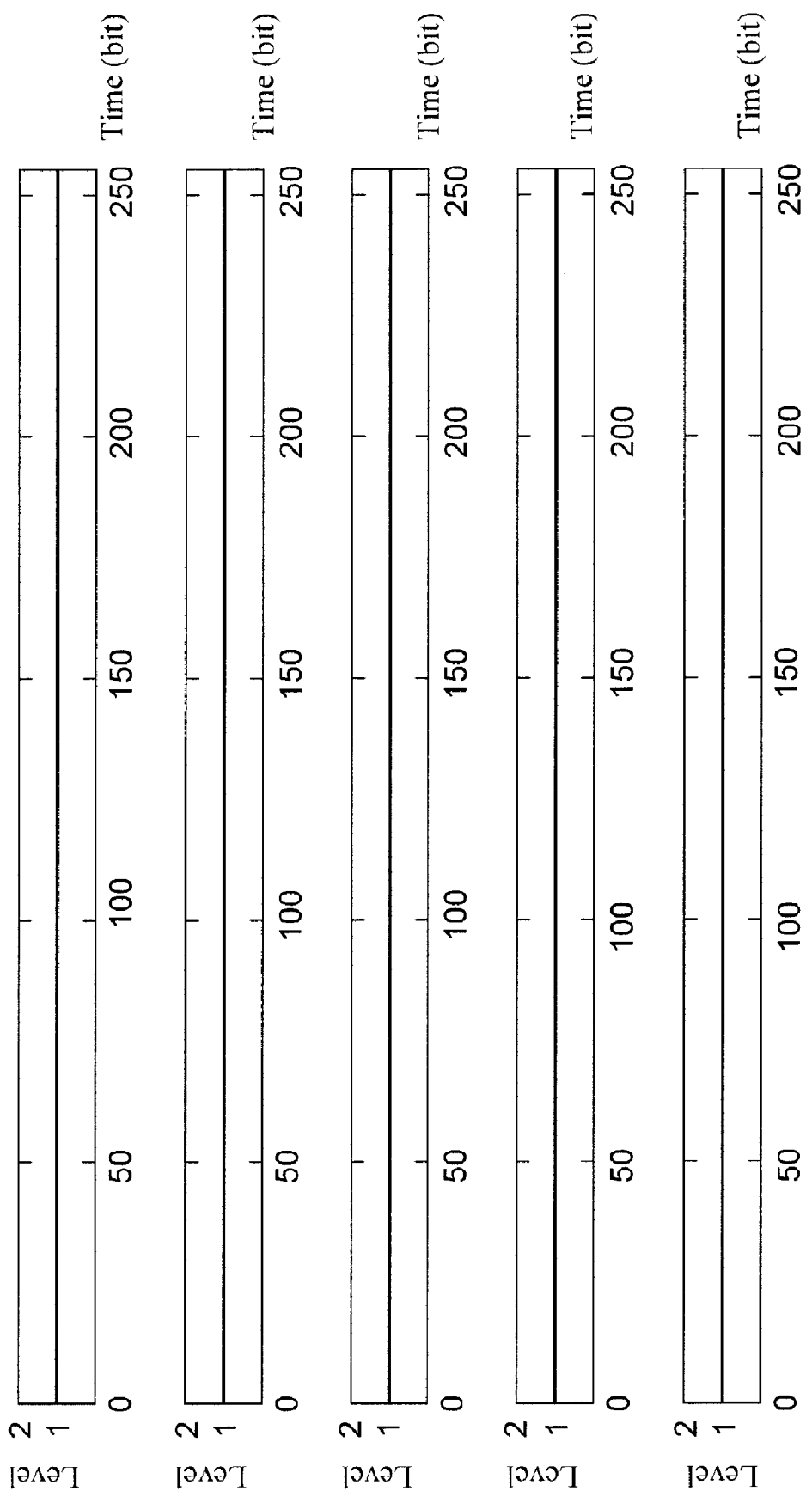
FIG. 8 is a schematic view of drive signals of green LED drive units.
Figure 9:
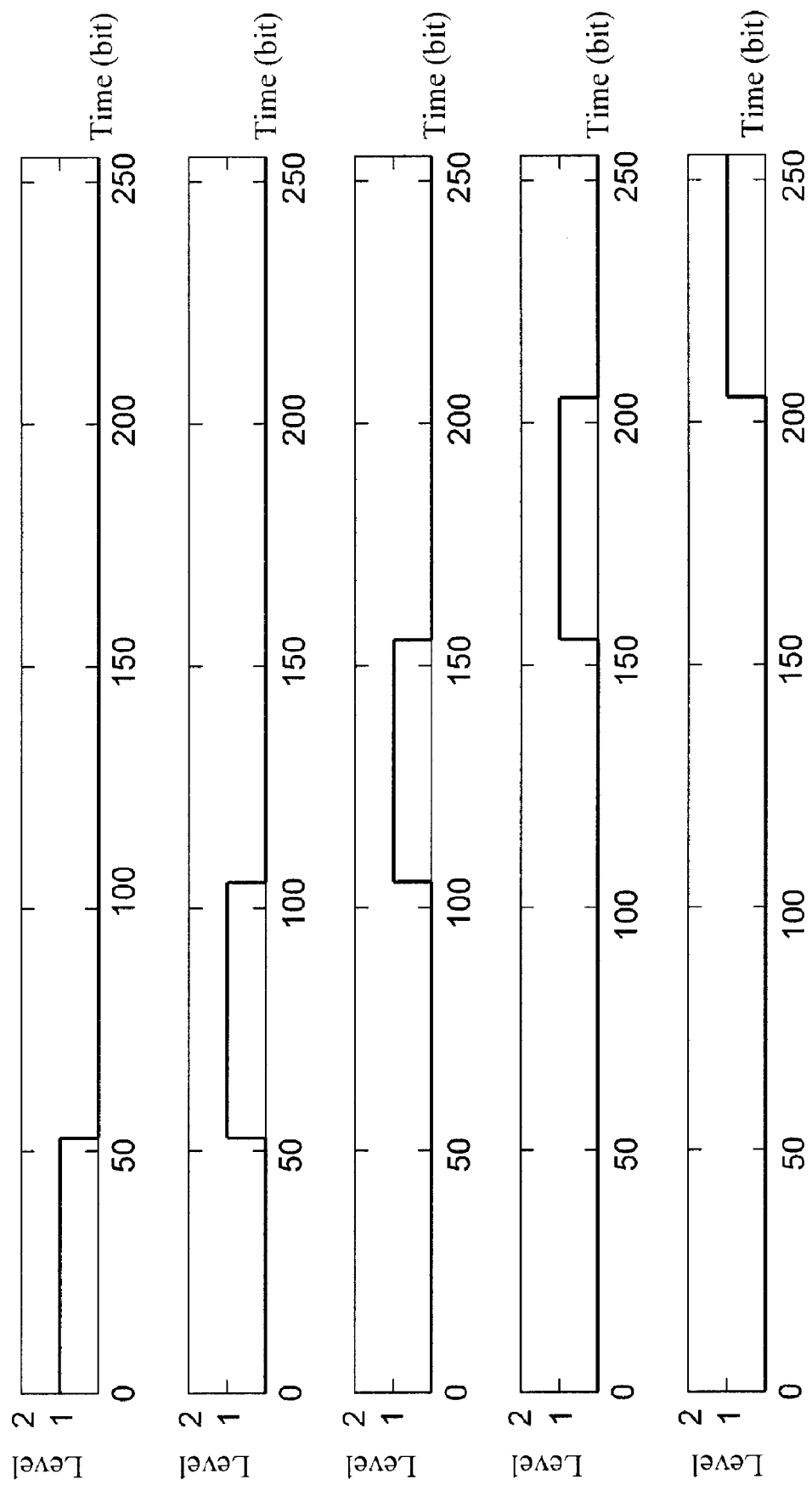
FIG. 9 is a schematic view of drive signals of blue LED drive units.

FIGS. 7, 8, 9 are schematic views of drive signals according to the fourth exemplary embodiment. The illumination parameter of the illumination setting unit 10 includes the number of the first drive units 40 (for example, 5 red LED drive units, 5 green LED drive units, and 5 blue LED drive units, i.e. totally 15 drive units), the work cycle of 1, the resolution of 255 bits, and the ratio of three primary colors of R:G:B is 120:200:40.

Next, the microprocessor 30 calculates the corresponding drive signals. Referring to FIG. 7, it is a schematic view of drive signals of red LED drive units. Referring to FIG. 8, it is a schematic view of drive signals of green LED drive units. Referring to FIG. 9, it is a schematic view of drive signals of blue LED drive units.

Figure 10A:
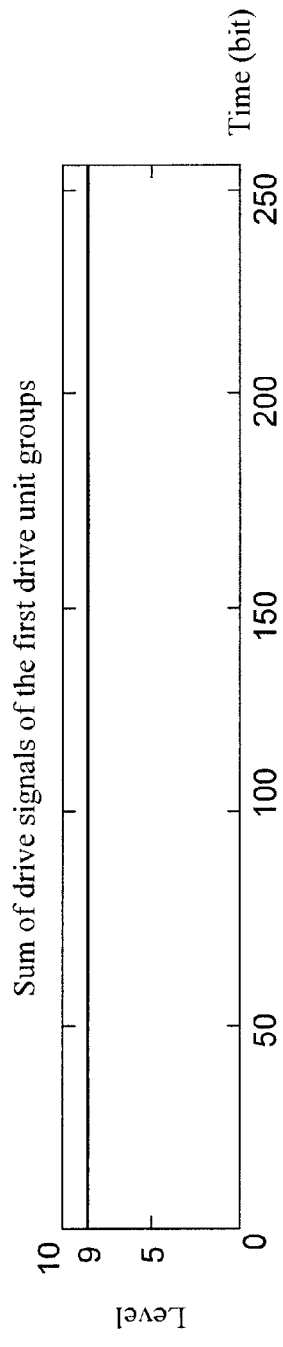
FIG. 10A is a schematic view of a sum of drive signals according to the fourth exemplary embodiment.
Figure 10B:
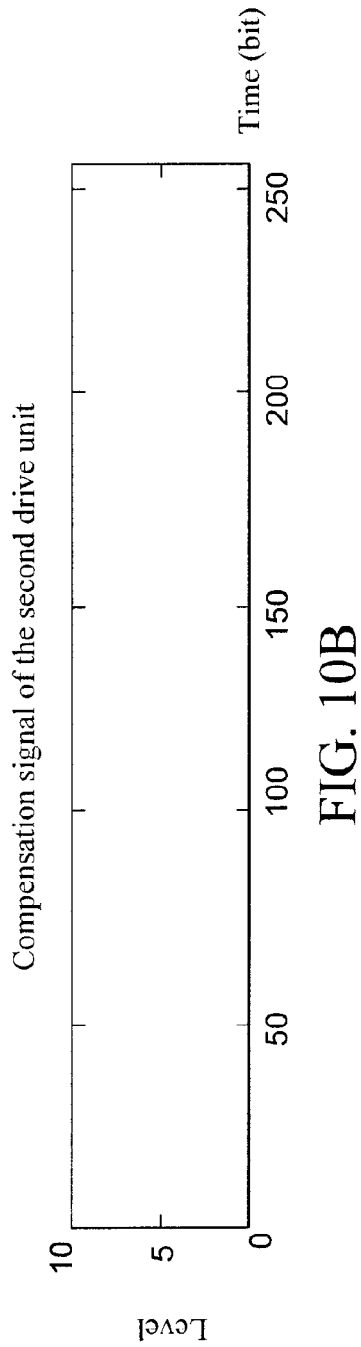
FIG. 10B is a schematic view of a compensation signal according to the fourth exemplary embodiment.
Figure 10C:
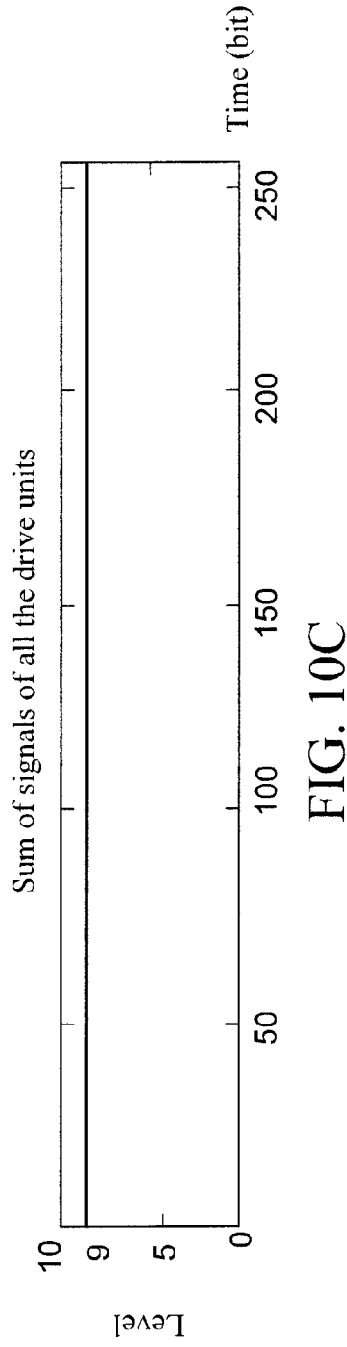
FIG. 10C is a schematic view of a sum of signals according to the fourth exemplary embodiment.

FIG. 10A is a schematic view of a sum of drive signals according to the fourth exemplary embodiment. Referring to FIG. 10A, it can be seen that, the sum of the drive signals of all the drive units (including the plurality of first drive unit groups 71 and the second drive unit 41) is a stable DC current, and with the drive signal of the second drive unit 41, the total current IT may be compensated into a DC current. However, as the sum of the drive signals of the plurality of first drive unit groups 71 is already a stable DC current, the drive signal of the second drive unit 41 is not required any more, thus it is kept 0 (as shown in FIG. 10B). FIG. 10C shows the sum of the signals of all the drive units (including the plurality of first drive unit groups 71 and the second drive unit 41).

Figure 11:
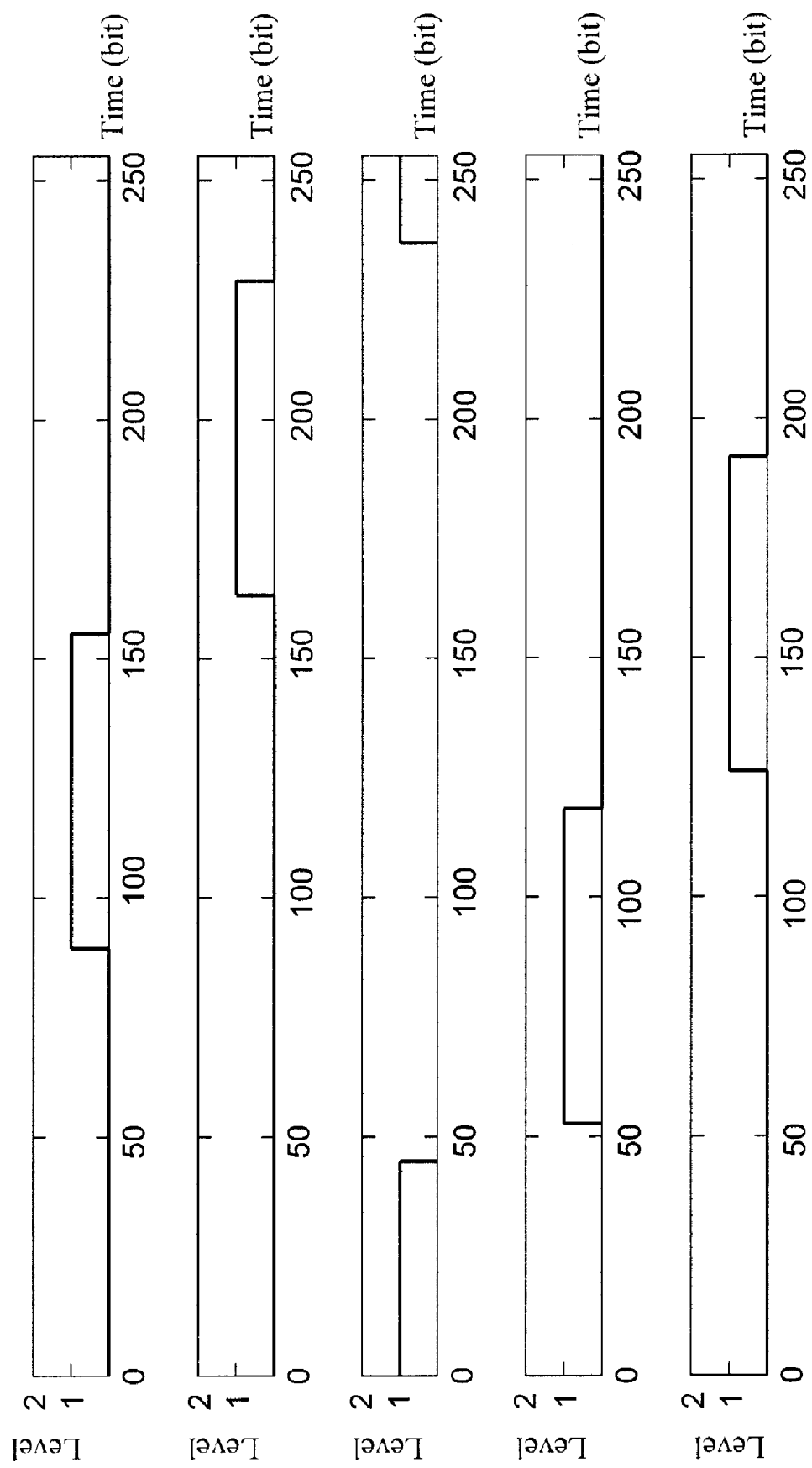
FIG. 11 is a schematic view of drive signals of red LED drive units.
Figure 12:
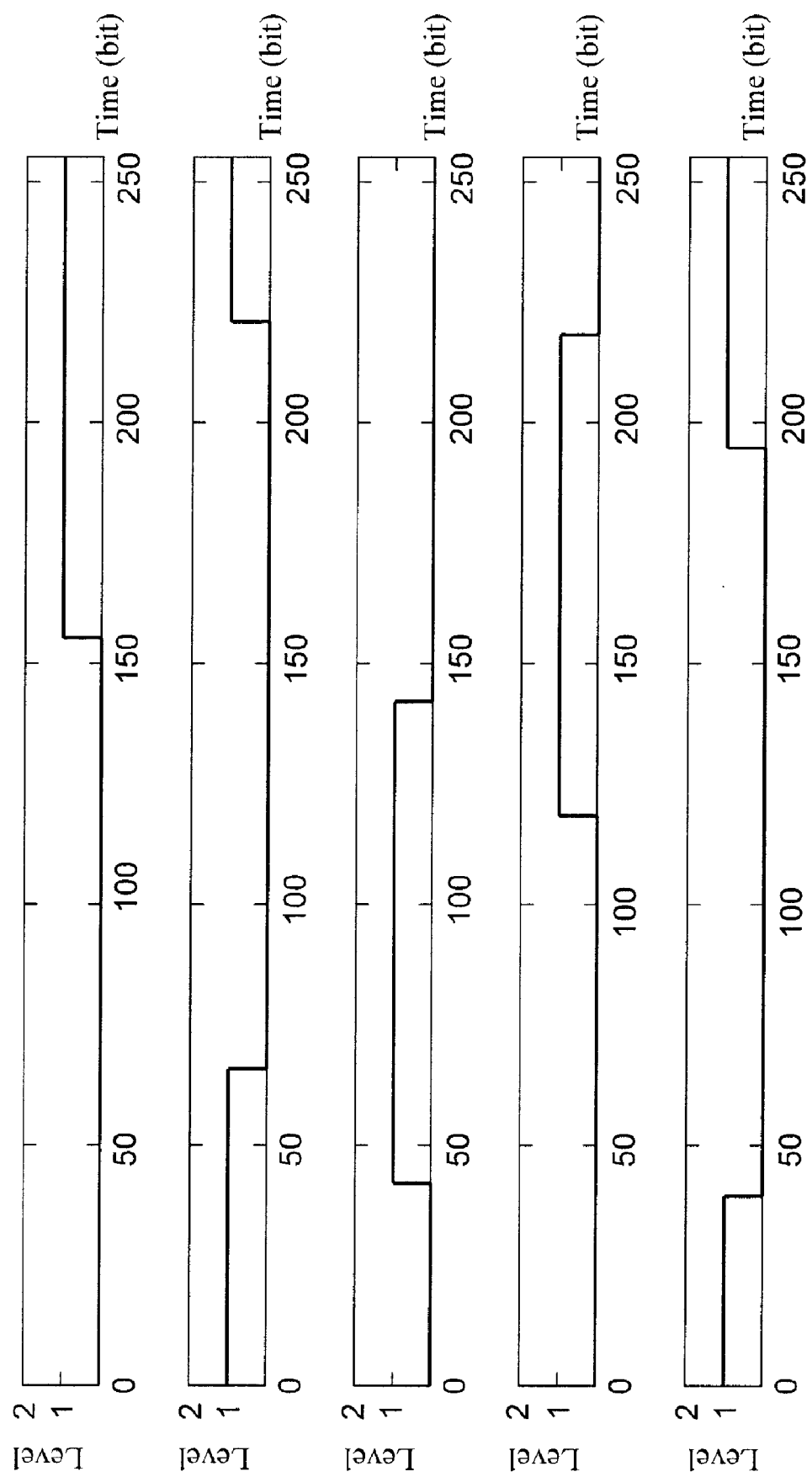
FIG. 12 is a schematic view of drive signals of green LED drive units.
Figure 13:
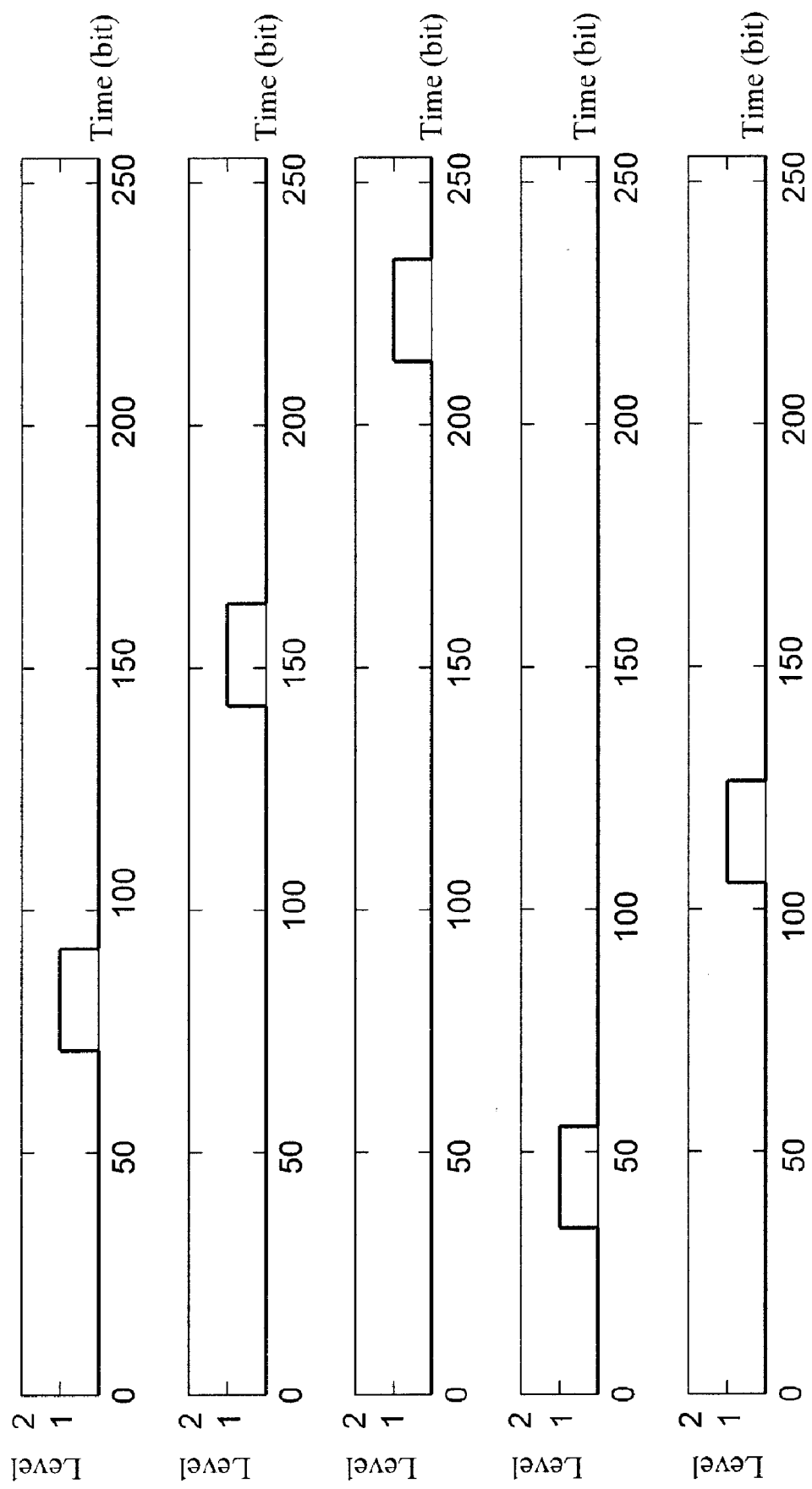
FIG. 13 is a schematic view of drive signals of blue LED drive units.

The illumination parameter of the illumination setting unit 10 is adjusted once again, in which the work cycle is adjusted to 0.4, and the other parameters are maintained the same as the previous ones. Next, referring to FIG. 11, it is a schematic view of drive signals of red LED drive units. Referring to FIG. 12, it is a schematic view of drive signals of green LED drive units. Referring to FIG. 13, it is a schematic view of drive signals of blue LED drive units.

Figure 14A:
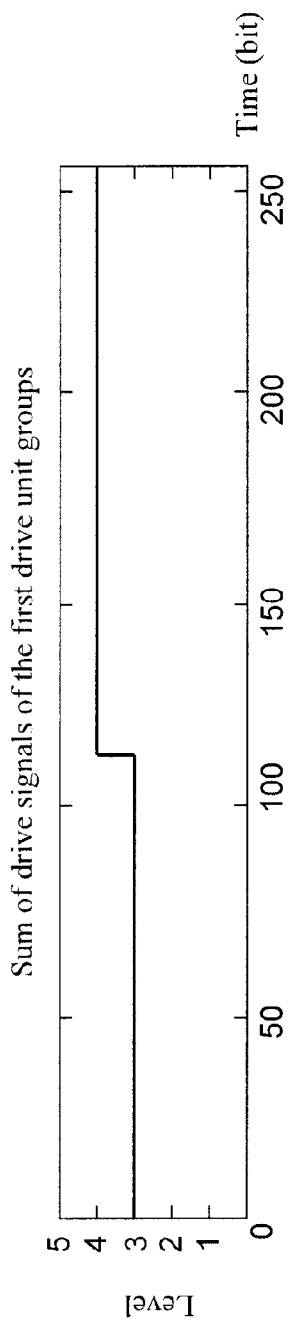
FIG. 14A is a schematic view of another sum of drive signals according to the fourth exemplary embodiment.
Figure 14B:
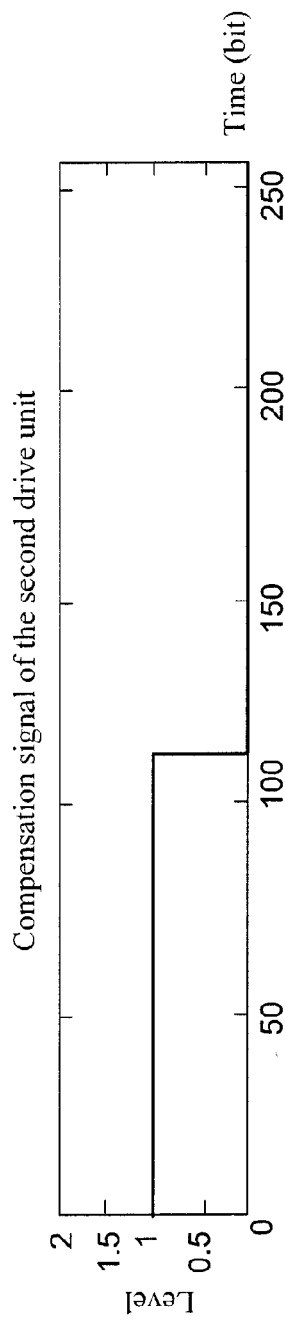
FIG. 14B is a schematic view of another compensation signal according to the fourth exemplary embodiment.
Figure 14C:
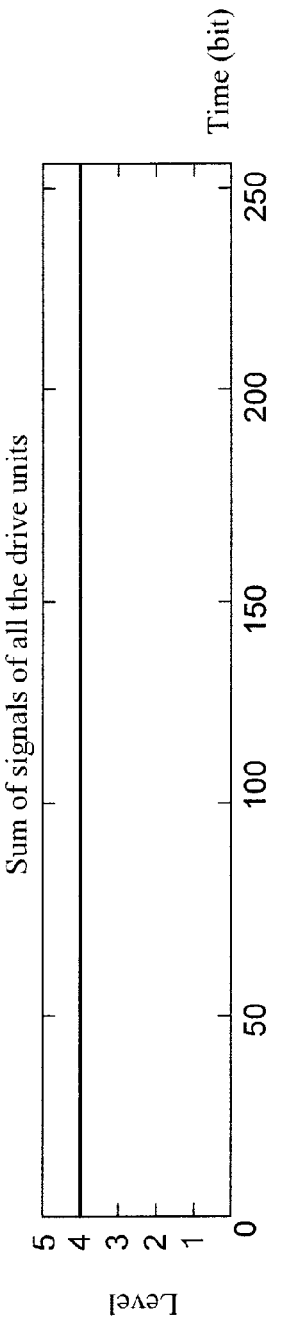
FIG. 14C is a schematic view of another sum of signals according to the fourth exemplary embodiment.

FIG. 14A is a schematic view of another sum of drive signals according to the exemplary embodiment. Referring to FIG. 14A, it can be seen that the sum of the drive signals of the first drive unit groups 71 is not a stable DC current, so that the compensation signal of the second drive unit 41 is not 0 (as shown in FIG. 14B). After compensation, it can be seen that the sum of the signals of all the drive units (including the first drive unit groups 71 and the second drive unit 41) becomes a stable DC current, which has a minimal level value of 4 (as shown in FIG. 14C).

In one exemplary embodiment, the sum of the high-level cycles of the n drive signals is p+r whole cycles, in which $0 \leq p \leq n$, $0 \leq r \leq 1$, p is a positive integer, and r is a natural number. When an end time point of a high-level cycle of one of the n drive signals is the starting time point of a high-level cycle of another one of the n drive signals, it is called one cycle continuity, and each of the n drive signals has (n-p-1) cycle continuities.

Figure 15A:
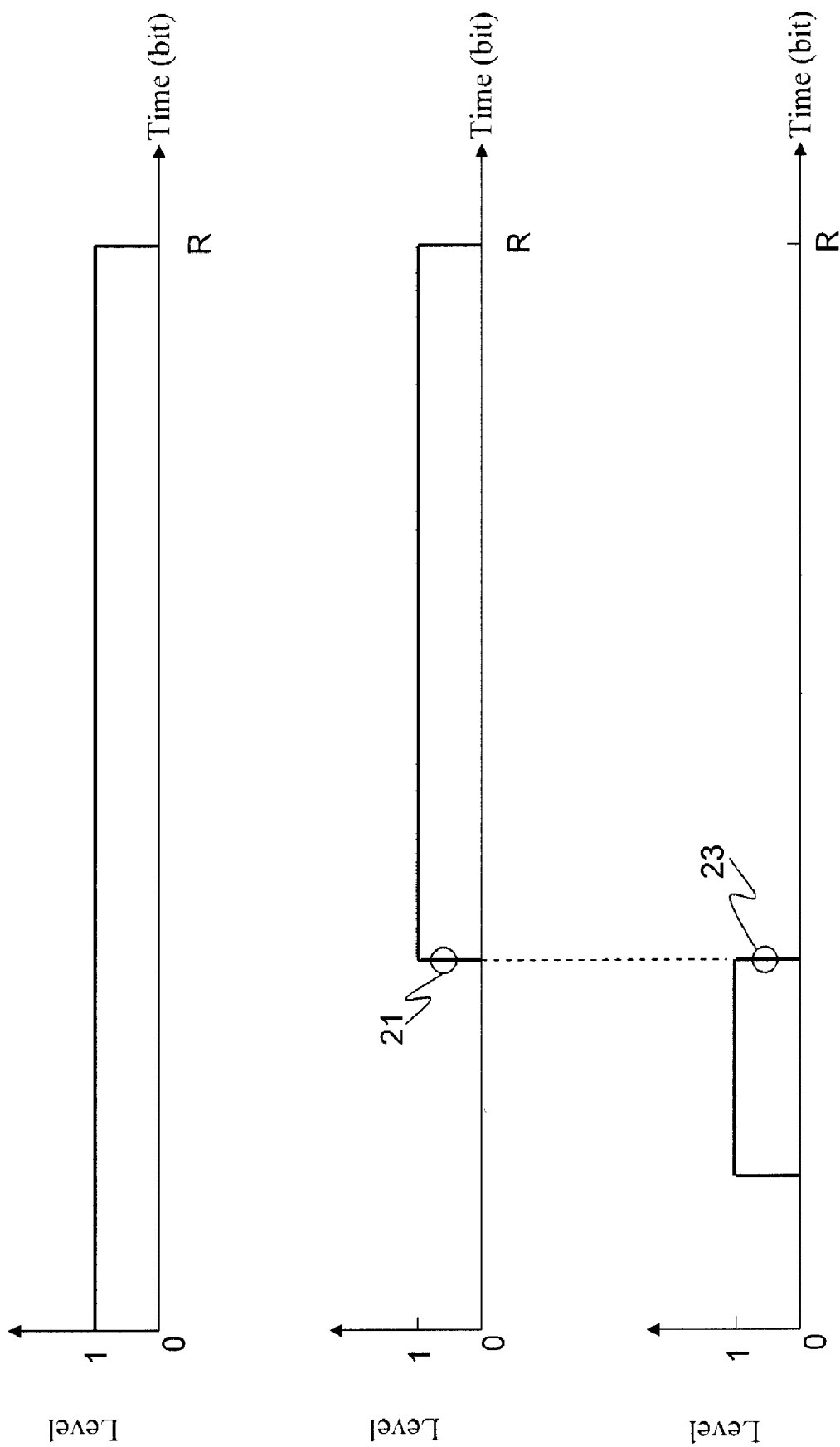
FIG. 15A is a schematic view of a first type of drive signals according to the exemplary embodiment.

Then, five encoding schemes for drive signals are provided according to the fourth exemplary embodiment. FIG. 15A is a schematic view of a first type of drive signals according to the exemplary embodiment. An end time point 23 of one high-level cycle is the same time instant of a starting time point 21 of another high-level cycle, thus there exists one cycle continuity.

Figure 15B:
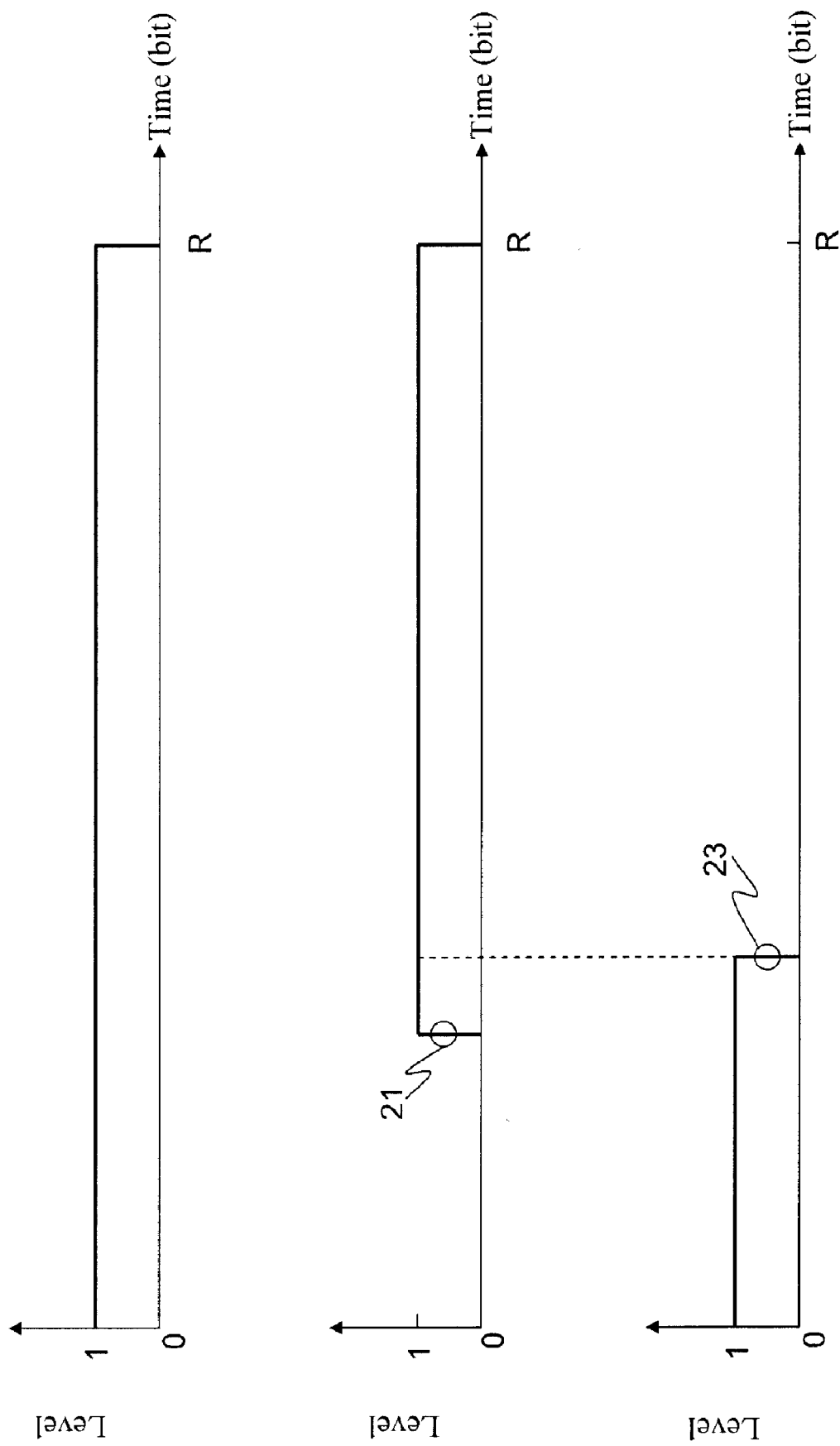
FIG. 15B is a schematic view of a second type of drive signals according to the exemplary embodiment.

FIG. 15B is a schematic view of a second type of drive signals according to the exemplary embodiment. Two drive signals having no cycle continuities are included, in which a starting time point 21 of a high-level cycle of one drive signal and an end time point 23 of a high-level cycle of the other drive signal are spaced apart for a time period of q overlapped bits, where q is a positive integer.

Figure 15C:
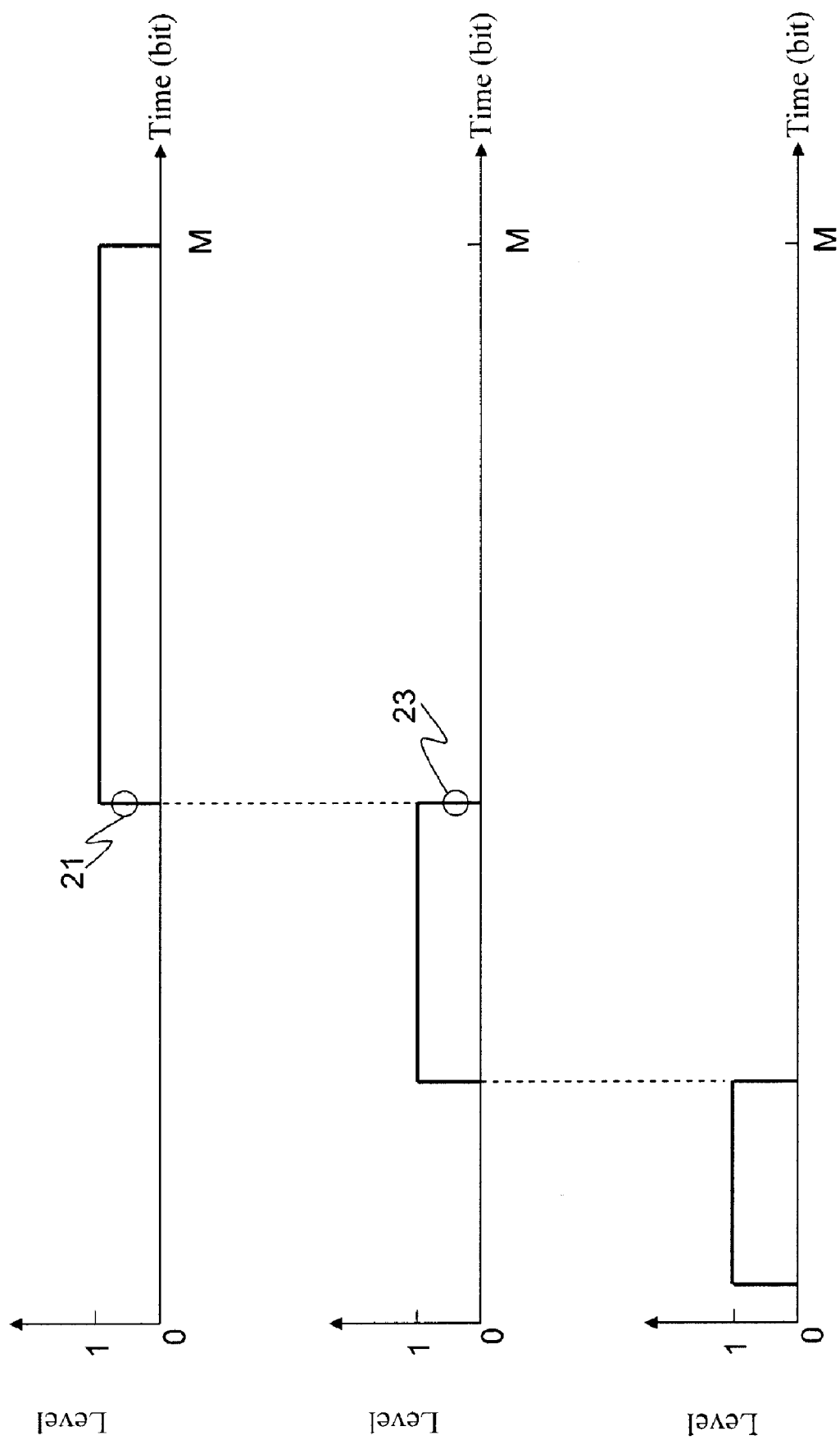
FIG. 15C is a schematic view of a third type of drive signals according to the exemplary embodiment.

FIG. 15C is a schematic view of a third type of drive signals according to the exemplary embodiment. An end time point 23 of a high-level cycle is the same time instant of a starting time point 21 of another high-level cycle, thus there exists one cycle continuity.

Figure 15D:
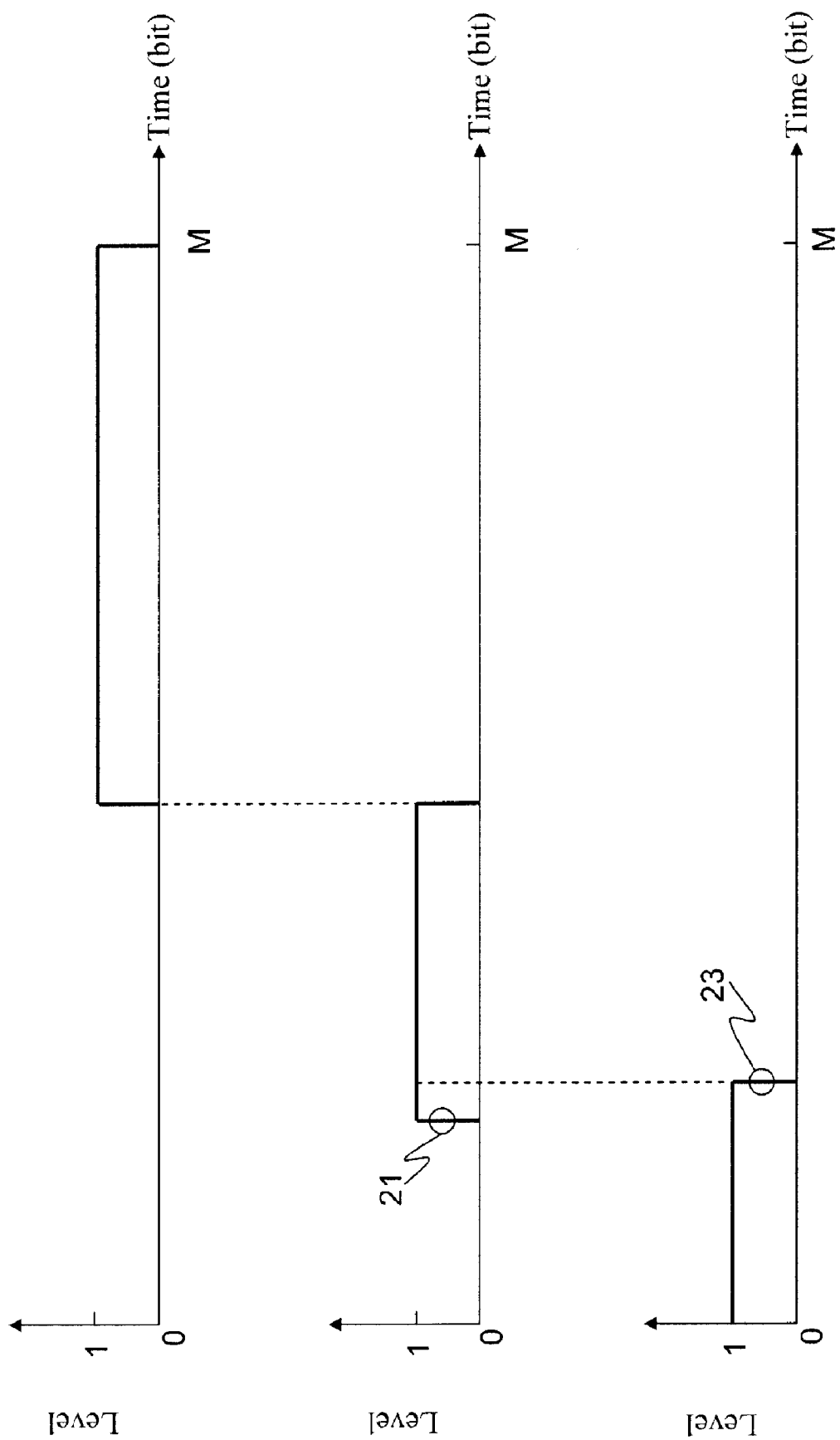
FIG. 15D is a schematic view of a fourth type of drive signals according to the exemplary embodiment.

FIG. 15D is a schematic view of a fourth type of drive signals according to the exemplary embodiment. Two drive signals having no cycle continuity are included, in which a starting time point 21 of a high-level cycle of one drive signal and an end time point 23 of a high-level cycle of the other drive signal are spaced apart for a time period of q overlapped bits, where q is a positive integer.

Figure 15E:
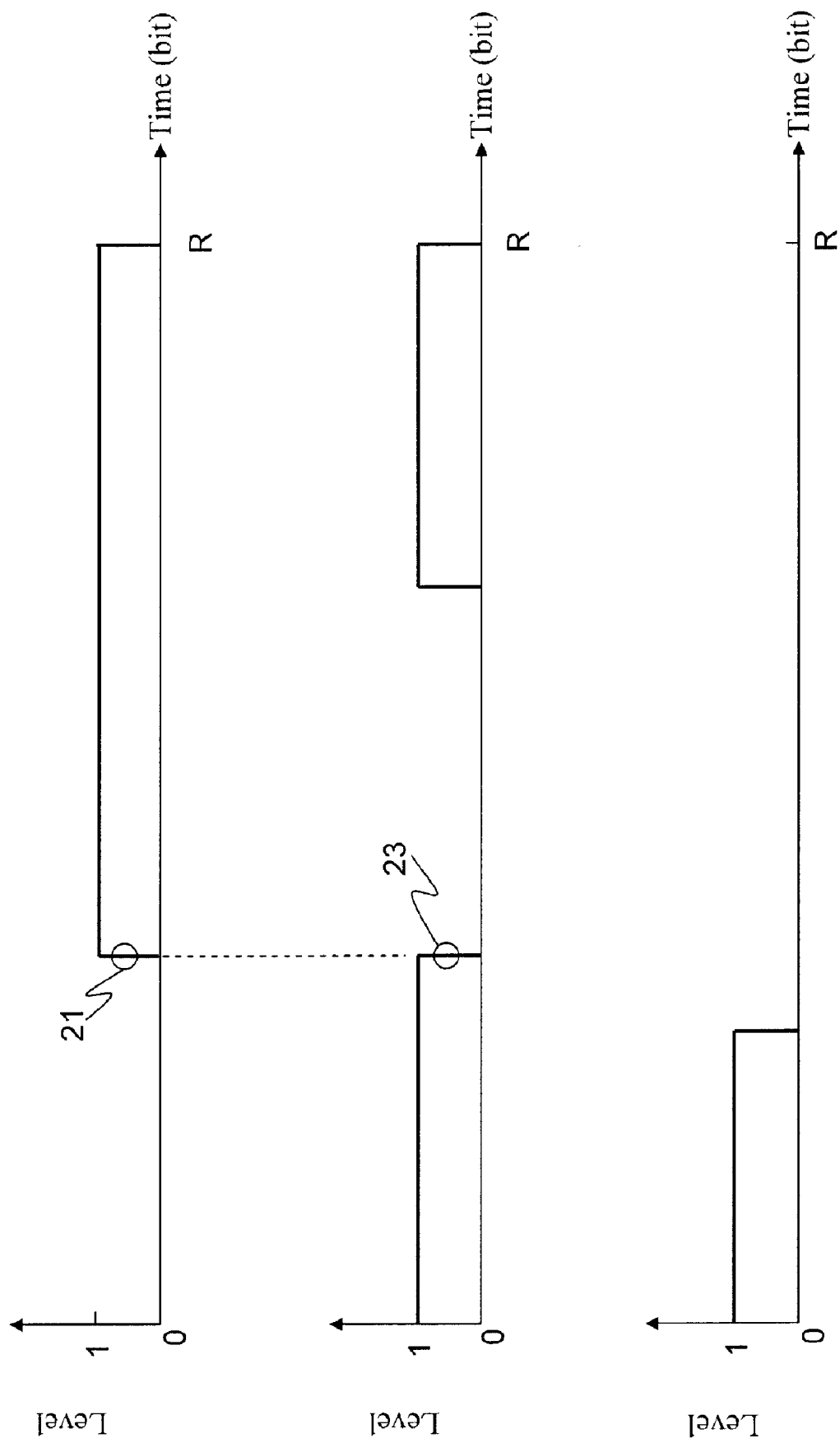
FIG. 15E is a schematic view of a fifth type of drive signals according to the exemplary embodiment.

FIG. 15E is a schematic view of a fifth type of drive signals according to the exemplary embodiment.

Furthermore, through the drive method of the one exemplary embodiment, the work cycle is gradually prolonged to increase the level of the total current to the maximum step by step during the activation, so as to prevent the current at the activation from being transiently increased to the maximum level, thereby avoiding the power integrity problems such as EMI and overshoot.

In view of the above, with such a drive system for an illumination device, a PWM drive signal is calculated to an LED drive unit through a microprocessor, so as to control the LED drive unit to turn on a corresponding LED at the minimum EMI, thereby avoiding the power integrity problems such as EMI and overshoot. Moreover, merely a memory capacity of (the number of the first drive units N*the resolution R) bits, that is, (N*R) bits, is required for the microprocessor to calculate the PWM drive signal, that is, the capacity required is considerably small, so that the PWM drive signal can be stored in an internal memory of the microprocessor, which thus is very convenient.

What is claimed is:

1. A drive system for an illumination device, comprising:
a plurality of light-emitting diodes (LEDs);
an extra load;
an illumination setting unit, for providing an illumination parameter, wherein the illumination parameter comprises a work cycle;
a power supply unit, for providing a direct current (DC);
a microprocessor, for receiving the illumination parameter and generating a plurality of pulse width modulation (PWM) signals including a plurality of drive signals and a compensation signal according to the received illumination parameter, wherein the plurality of drive signals correspond to the plurality of LEDs respectively;
a plurality of first drive units corresponding to the plurality of LEDs and the plurality of drive signals respectively, wherein each of the first drive units receives one of the plurality of drive signals to drive corresponding one of the plurality of LEDs respectively, where the corresponding LED receives the DC for illumination; and
a second drive unit, for receiving the compensation signal and outputting the DC to the extra load according to the compensation signal;
wherein each of the plurality of drive signals has a high-level cycle, a low-level cycle and a whole cycle, a ratio of the high-level cycle to the whole cycle is equal to the work cycle, a starting time point of the high-level cycle of one of the plurality of drive signals and a starting time point of the high-level cycle of another one of the plurality of drive signals are spaced apart for a time period of the low-level cycle of the another one drive signal, a high-level sum is a summation of all the plurality of drive signals at each time point during the whole cycle thereof, a highest level value is a maximum value of the high-level sums during the whole cycle, and the compensation signal is a signal for compensating each of the high-level sums to the highest level value at each time point during the whole cycle.

2. The drive system for an illumination device according to claim 1, wherein the illumination parameter further comprises a resolution, a ratio of polychrome primary colors and a number of the first drive units.

3. A drive system for an illumination device, comprising:
a plurality of light-emitting diode (LED) lamps, wherein each of the plurality of LED lamps has n LEDs, and n is an integer greater than or equal to 1;
an extra load;
an illumination setting unit, for providing an illumination parameter, wherein the illumination parameter comprises n work cycles, and the n work cycles correspond to the n LEDs in each of the plurality of LED lamps;
a power supply unit, for providing a direct current (DC);
a microprocessor, for receiving the illumination parameter and generating a plurality of pulse width modulation (PWM) signals including a plurality of drive signal sets and a compensation signal according to the received illumination parameter, wherein the plurality of drive signal sets correspond to the plurality of LED lamps, and each of the plurality of drive signal sets has n drive signals corresponding to the n LEDs and the n work cycles;
a plurality of first drive unit groups corresponding to the plurality of LED lamps and the plurality of drive signal sets respectively, wherein each of the first drive unit groups has n first drive units, and each of the first drive units receives corresponding one of the n drive signals to drive corresponding one of the n LEDs respectively, where the corresponding LED receives the DC for illumination; and
a second drive unit, for receiving the compensation signal and outputting the DC to the extra load according to the compensation signal;
wherein each of the n drive signals has a high-level cycle, a low-level cycle and a whole cycle, a ratio of each high-level cycle to corresponding one of the whole cycles is equal to corresponding one of work cycles, a starting time point of the high-level cycle of the ith drive signal of one drive signal set and a starting time point of the high-level cycle of the ith drive signal of another one drive signal set are spaced apart for a time period of the low-level cycle of the ith drive signal of the another one drive signal set, a high-level sum is a summation of all the n drive signals at each time point during the whole cycle thereof, a highest level value is a maximum value of the high-level sums, the compensation signal is a signal for compensating each of the high-level sums to the highest level value at each time point during the whole cycle, where $1 \leq i \leq n$, and i is positive integer.

4. The drive system for an illumination device according to claim 3, wherein a difference between the high-level sums at each time point is less than or equal to one unit level.

5. The drive system for an illumination device according to claim 3, wherein an end time point of the high-level cycle of one of the n drive signals is the same time instant of a starting time point of the high-level cycle of another one of the n drive signals.

6. The drive system for an illumination device according to claim 3, wherein a sum of the high-level cycles of the n drive signals is p+r whole cycles, $0 \leq p \leq n$, $0 \leq r \leq 1$, p is a positive integer, r is a natural number, and when an end time point of the high-level cycle of one of the n drive signals is the same time instant of a starting time point of the high-level cycle of another one of the n drive signals, there is one cycle continuity, so that the n drive signals have (n-p-1) cycle continuities.

7. The drive system for an illumination device according to claim 3, wherein the illumination parameter further comprises a resolution, a ratio of polychrome primary colors and a number of the first drive units.

8. A drive system for an illumination device, comprising:
a plurality of light-emitting diode (LED) lamps, wherein each of the plurality of LED lamps has n LEDs corresponding to one another, and n is an integer greater than or equal to 1,
an extra load;
an illumination setting unit, for providing an illumination parameter, wherein the illumination parameter comprises n work cycles, and the n work cycles correspond to the n LEDs in each of the plurality of LED lamps;
a power supply unit, for providing a direct current (DC);
a microprocessor, for receiving the illumination parameter and generating a plurality of pulse width modulation (PWM) signals including a plurality of drive signal sets and a compensation signal according to the received illumination parameter, wherein the plurality of drive signal sets correspond to the plurality of LED lamps, each of the plurality of drive signal sets has n drive signals corresponding to the n LEDs and the n work cycles, and the n drive signals at least comprises two drive signals having no cycle continuities;
a plurality of first drive unit groups, corresponding to the plurality of LED lamps and the plurality of drive signal sets respectively, wherein each of the first drive unit groups has n first drive units, and each of the first drive units receives corresponding one of the n drive signals to drive corresponding one of the n LEDs respectively, where the corresponding LED receives the DC for illumination; and
a second drive unit, for receiving the compensation signal and outputting the DC current to the extra load according to the compensation signal;
wherein each of the n drive signals has a high-level cycle, a low-level cycle and a whole cycle, a ratio of the high-level cycle to the whole cycle in each of the n driving signals is equal to the work cycle, a high-level sum is a summation of all the n drive signals at each time point during the whole cycle thereof, the difference between the high-level sums at each time point is less than or equal to one unit level, a starting time point and an end time point of the plurality of drive signals having no cycle continuities are spaced apart from each other for a time period of q overlapped cycles, where q is a positive integer.

9. The drive system for an illumination device according to claim 8, wherein an end time point of the high-level cycle of one of the n drive signals is the same time instant of a starting time point of the high-level cycle of another one of the n drive signals.

10. The drive system for an illumination device according to claim 8, wherein a sum of the high-level cycles of the n drive signals is p+r whole cycles, $0 \leq p \leq n$, $0 \leq r \leq 1$, p is a positive integer, r is a natural number, and when an end time point of high-level cycle of one of the n drive signals is the same time instant of a starting time point of the high-level cycle of another one of the n drive signals, there is one cycle continuity, so that the n drive signals have (n-p-1) cycle continuities.

11. The drive system for an illumination device according to claim 8, wherein the illumination parameter further comprises a resolution, a ratio of polychrome primary colors and a number of the first drive units.

12. A drive system for an illumination device, comprising:
a plurality of LED lamps, wherein each of the plurality of LED lamps has n LEDs, and n is an integer greater than or equal to 1;
an extra load;
an illumination setting unit, for providing an illumination parameter which comprises n work cycles which correspond to the n LEDs in each of the plurality of LED lamps;
a power supply unit, for providing a direct current (DC);
a microprocessor, for receiving the illumination parameter and generating a plurality of pulse width modulation (PWM) signals including a plurality of drive signal sets and a compensation signal according to the received illumination parameter, wherein the plurality of drive signal sets correspond to the plurality of LED lamps, each of the plurality of drive signal sets comprises n drive signals corresponding to the n LEDs and the n work cycles, and the n drive signals at least comprise two drive signals without cycle continuities;
a plurality of first drive unit groups corresponding to the plurality of LED lamps and the plurality of drive signal sets respectively, wherein each of the first drive unit groups has n first drive units, and each of the first drive units receives corresponding one of the n drive signals to drive corresponding one of the n LEDs respectively, where the corresponding LED receives the DC for illumination; and
a second drive unit, for receiving the compensation signal and outputting the DC to the extra load according to the compensation signal;
wherein each of the n drive signals has a high-level cycle, a low-level cycle and a whole cycle, a ratio of each high-level cycle to corresponding one of the whole cycles is equal to the corresponding one of work cycles, a starting time point of the high-level cycle of the ith drive signal of one of the plurality of drive signal sets and a starting time point of the high-level cycle of the ith drive signal of another drive signal set are spaced apart for a time period of one low-level cycle of the ith drive signal of the another drive signal set, and a starting time point and an end time point of the two drive signals having no cycle continuities are spaced apart from each other for a time period of q overlapped bits, where $1 \leq i \leq n$, and i and q are positive integers.

* * * * *